US008972281B2

(12) United States Patent
Pokonosky

(10) Patent No.: US 8,972,281 B2
(45) Date of Patent: Mar. 3, 2015

(54) MEDIA MARKETING SYSTEM AND METHOD

(75) Inventor: Thomas J Pokonosky, San Diego, CA (US)

(73) Assignee: Wigglewireless, LLC, San Diego, CA (US)

(\*) Notice: Subject to any disclaimer, the term of this patent is extended or adjusted under 35 U.S.C. 154(b) by 1399 days.

(21) Appl. No.: 11/556,501

(22) Filed: Nov. 3, 2006

(65) Prior Publication Data

US 2007/0130010 A1 Jun. 7, 2007

Related U.S. Application Data

(60) Provisional application No. 60/733,132, filed on Nov. 3, 2005.

(51) Int. Cl.
*G06Q 30/00* (2012.01)
*G06Q 30/02* (2012.01)

(52) U.S. Cl.
CPC ........ G06Q 30/0267 (2013.01); G06Q 30/0251 (2013.01); G06Q 30/0255 (2013.01); G06Q 30/0241 (2013.01); G06Q 30/02 (2013.01);
(Continued)

(58) Field of Classification Search
CPC .......... G06Q 30/0241; G06Q 30/0251; G06Q 30/0267; G06Q 30/0269; G06Q 30/0255; G06Q 30/0273; G06Q 30/0276
USPC ........... 705/14.17, 14.4, 14.49, 14.73, 14, 49, 705/14.64, 14.66, 14.53, 14.69, 14.72
See application file for complete search history.

(56) References Cited

U.S. PATENT DOCUMENTS 5,848,397 A * 12/1998 Marsh et al. ................ 705/14.61
5,903,816 A * 5/1999 Broadwin et al. ............ 725/110
(Continued)

FOREIGN PATENT DOCUMENTS

WO WO 00/02389 * 1/2000 ............. H04N 7/173
WO WO 01/77776 A2 * 10/2001

OTHER PUBLICATIONS

Oh, Xu, Effects of Multimedia on Mobile Consumer Behavior: An Empirical Study of Location-Aware Advertising, Interntational Conference on Information Systems 2003, p. 680.*

*Primary Examiner* — Bennett Sigmond
(74) *Attorney, Agent, or Firm* — Mintz Levin Cohn Ferris Glovsky and Popeo, P.C.

(57) ABSTRACT

A system and process is provided for distributing branding and content messages to wireless mobile devices such as mobile handsets. The system has a mobile media portal process that enables a content owner and one or more sponsors to cooperate in negotiating, planning, and executing a branding or content campaign. For a campaign, a set of consumers has indicated a desire to receive particular content information on their mobile handset, and may have used a web interface or their phone to provide demographic information and content choices. A media center interface, either automatically or under human control, associates a particular marketing message from a sponsor with the content information, and distributes the marketing message and information to the user's handset. Since the marketing message has been selected and adapted to the demographics and preferences of the user, it is likely that the user will positively respond to receiving the marketing message.

8 Claims, 22 Drawing Sheets

(52) U.S. Cl.
CPC ........ *G06Q 30/0249* (2013.01); *G06Q 30/0269* (2013.01); *G06Q 30/0273* (2013.01); *G06Q 30/0276* (2013.01)
USPC ................... 705/14.64; 705/14.4; 705/14.49; 705/14.53; 705/14.66; 705/14.69; 705/14.72

(56) References Cited

U.S. PATENT DOCUMENTS

| | | | |
|---|---|---|---|
| 6,606,644 B1* | 8/2003 | Ford et al. | 709/203 |
| 6,654,725 B1* | 11/2003 | Langheinrich et al. | 705/14.52 |
| 6,698,020 B1* | 2/2004 | Zigmond et al. | 725/34 |
| 6,760,916 B2* | 7/2004 | Holtz et al. | 725/34 |
| 6,985,882 B1 | 1/2006 | Del Sesto | |
| 7,043,746 B2* | 5/2006 | Ma | 725/22 |
| 7,068,189 B2* | 6/2006 | Brescia | 340/995.1 |
| 7,185,353 B2* | 2/2007 | Schlack | 725/35 |
| 7,440,674 B2* | 10/2008 | Plotnick et al. | 386/343 |
| 7,636,792 B1* | 12/2009 | Ho | 709/246 |
| 7,650,617 B2* | 1/2010 | Hoshino et al. | 725/34 |
| 7,653,923 B2* | 1/2010 | Flickinger | 725/36 |
| 7,725,350 B2* | 5/2010 | Schlee | 705/14.49 |
| 7,734,503 B2* | 6/2010 | Agarwal et al. | 705/14.54 |
| 7,856,378 B2 | 12/2010 | Mashinsky et al. | |
| 7,949,562 B2 | 5/2011 | Collins | |
| 8,554,054 B2* | 10/2013 | Innocenti et al. | 386/248 |
| 2001/0034654 A1* | 10/2001 | Vigil et al. | 705/14 |
| 2001/0039515 A1 | 11/2001 | Mayadas | |
| 2002/0013757 A1 | 1/2002 | Bykowsky et al. | |
| 2002/0049635 A1* | 4/2002 | Mai et al. | 705/14 |
| 2002/0077897 A1* | 6/2002 | Zellner et al. | 705/14 |
| 2002/0083439 A1* | 6/2002 | Eldering | 725/32 |
| 2002/0099600 A1* | 7/2002 | Merriman et al. | 705/14 |
| 2002/0107739 A1* | 8/2002 | Schlee | 705/14 |
| 2002/0142792 A1* | 10/2002 | Martinez | 455/550 |
| 2002/0178054 A1* | 11/2002 | Ader | 705/14 |
| 2002/0178447 A1* | 11/2002 | Plotnick et al. | 725/36 |
| 2002/0188527 A1 | 12/2002 | Dillard et al. | |
| 2002/0194062 A1* | 12/2002 | Linde | 705/14 |
| 2003/0037013 A1* | 2/2003 | Aoki et al. | 705/77 |
| 2003/0070167 A1* | 4/2003 | Holtz et al. | 725/32 |
| 2003/0163359 A1* | 8/2003 | Kanesaka | 705/8 |
| 2003/0171990 A1 | 9/2003 | Rao et al. | |
| 2003/0177490 A1 | 9/2003 | Hoshino et al. | |
| 2003/0208754 A1* | 11/2003 | Sridhar et al. | 725/34 |
| 2004/0059625 A1* | 3/2004 | Schrader | 705/10 |
| 2004/0064351 A1 | 4/2004 | Mikurak | |
| 2004/0181448 A1 | 9/2004 | Hartsman et al. | |
| 2004/0230994 A1* | 11/2004 | Urdang et al. | 725/88 |
| 2004/0260605 A1* | 12/2004 | McIntyre et al. | 705/14 |
| 2005/0060759 A1 | 3/2005 | Rowe et al. | |
| 2005/0114783 A1* | 5/2005 | Szeto | 715/747 |
| 2005/0256765 A1* | 11/2005 | Lin et al. | 705/14 |
| 2006/0026067 A1* | 2/2006 | Nicholas et al. | 705/14 |
| 2006/0074749 A1 | 4/2006 | Kline et al. | |
| 2006/0074752 A1 | 4/2006 | Newmark | |
| 2006/0217110 A1* | 9/2006 | Othmer | 455/414.1 |
| 2006/0224943 A1* | 10/2006 | Snyder et al. | 715/501.1 |
| 2006/0282314 A1 | 12/2006 | Zamanian et al. | |
| 2006/0287916 A1* | 12/2006 | Starr et al. | 705/14 |
| 2007/0027773 A1* | 2/2007 | Lee | 705/14 |
| 2007/0038514 A1* | 2/2007 | Patterson et al. | 705/14 |
| 2007/0055565 A1* | 3/2007 | Baur et al. | 705/14 |
| 2007/0078707 A1* | 4/2007 | Axe et al. | 705/14 |
| 2007/0100656 A1* | 5/2007 | Brown | 705/1 |
| 2007/0118396 A1* | 5/2007 | Matz et al. | 705/1 |
| 2007/0156534 A1* | 7/2007 | Lerner et al. | 705/14 |
| 2007/0288309 A1* | 12/2007 | Haberman et al. | 705/14 |
| 2008/0071929 A1* | 3/2008 | Motte et al. | 709/246 |
| 2009/0089131 A1* | 4/2009 | Moukas et al. | 705/8 |

\* cited by examiner

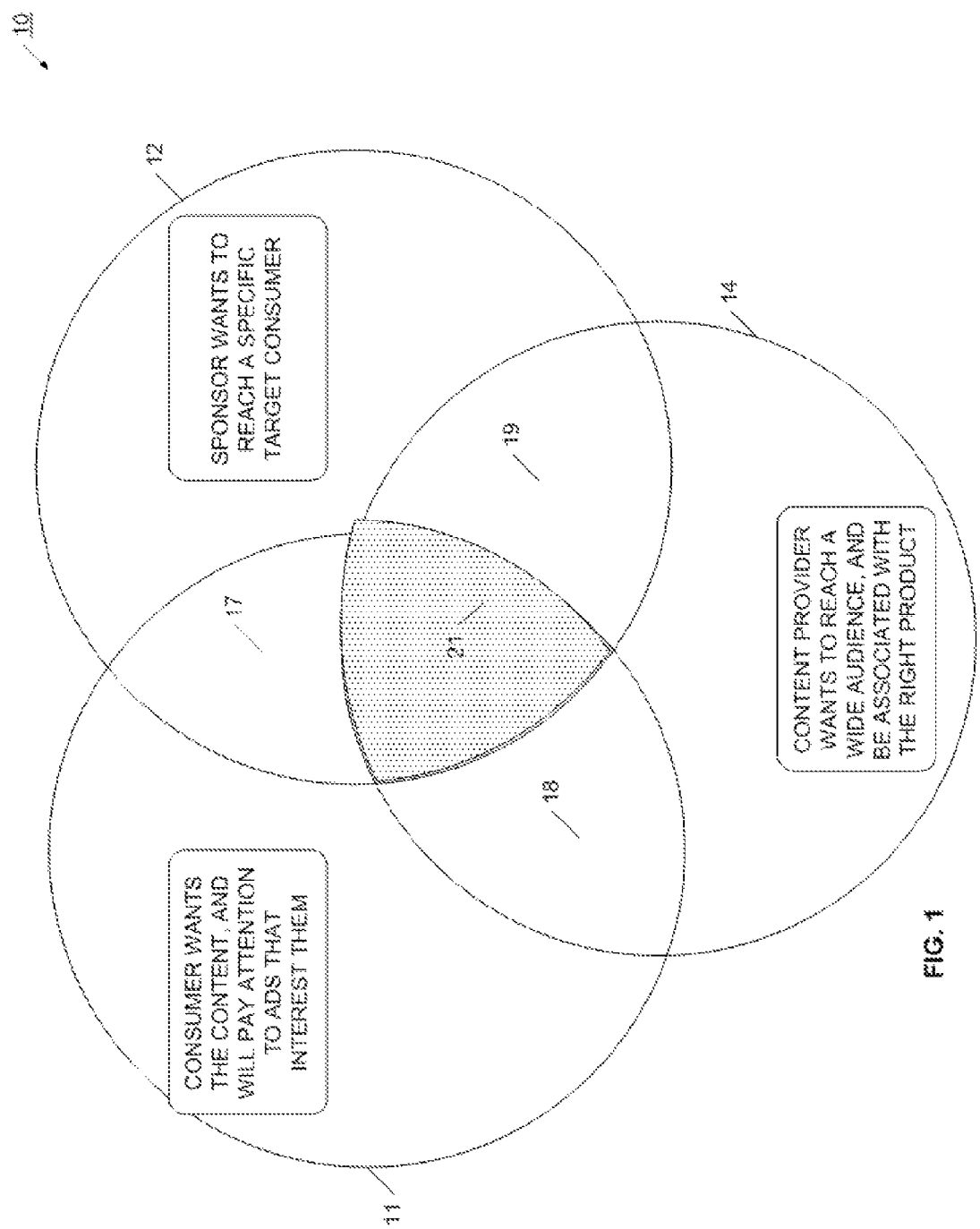

FIG. 18

MEDIA MARKETING SYSTEM AND METHOD

RELATED APPLICATIONS

This application claims priority to U.S. patent application No. 60/733,132, filed Nov. 3, 2005, and entitled "Media Marketing System and Method", which is incorporated herein in its entirety.

BACKGROUND

The field of the present invention is computer applications for managing and distributing marketing messages. More particularly, the present invention relates to a computer application and system for selecting and distributing content information and brand messages to the mobile handsets of a set of target users, and for generating metrics regarding those messages.

As technology advances and consumers become more sophisticated, it has become more difficult for advertisers, brands, or sponsors to reach targeted consumer markets. For example, consumers are using devices like digital video recorders (DVR) to bypass commercial messages on television programs and viewing more pay-per-view and video-on-demand (VOD) programming. These latter broadcasting models are subscription based, and therefore no advertising is typically allowed. For the more traditional advertising models, it is therefore increasingly necessary to offer commercial messages that consumers want to receive, otherwise they will simply use current technology to avoid the message. Further, for messages that a consumer is interested in, the consumer is far more likely to see or hear the message, and has the highest likelihood of acting on the received message, for example, by making a response or even purchasing a product.

Consumers are also aware that advancing technology makes more timely and relevant information available to them. For example, near real time traffic reports may be received from a website service or even delivered to a mobile wireless handset. In a particularly personal use, the traffic service may be aware of all of a user's typical travel patterns, and may even detect the position of the user's mobile wireless handset. In this way, the traffic information delivered to the user is highly personal to the user's current location and condition. More generally, consumers are expanding their view of media "content" from the traditional video, music, wallpaper, and ring tones, to include personalized and specific information and data. Personalized data may be, for example, information regarding a favorite team, location of friends, a child's progress in school, local traffic, or weather updates. Information adjusted or adapted for personal use is some of the most valued information, but no convenient vehicle has existed to deliver it to the consumer. Since users greatly value this personalized information, users typically register and pay for subscription services for this personalized content.

The traditional radio, TV, magazine, and newspaper advertising are intended for general distribution to a large diverse population. In this regard, these advertisements are directed to large audiences, and do not provide personal messages or data. Further, with so many advertising platforms, any advertising campaign is fragmented according to each platform's requirements, timing, and limitations. It is also very difficult to measure the effectiveness of any ad campaign, or to attribute a success to any particular marketing message or tactic. Even though the goal of this traditional advertising is to stimulate an individual, the mediums are so fragmented and unaccountable that advertising is priced on the cost per 1000 impressions. Stated differently, because these traditional mediums cannot account for individual reaction, they resort to pricing only on a guess as to how many people may see the ad. Also, consumers are moving away from the more traditional static entertainment devices such as radio and TV, and relying more on personal media devices, such as wireless handsets, for more entertainment services. These personal media devices are typically compact, may be portable, and are convenient, but the opportunity for distributing targeted messages is limited. In a particular example, a mobile wireless handset is used to provide entertainment and data services for a consumer. The wireless mobile handset is a personal device, in much the same way a person carries a wallet or purse. A person's wireless handset is typically controlled and used by only 1 person, and is tuned to the specific desires and preferences of that user. Accordingly, a message sent to a wireless handset is almost certainly received and viewed by the intended user. For many, the wireless mobile handset is an indispensable personal and business tool that is nearly always close by, and represents the link to friends, family, and coworkers, as well as a significant means of receiving entertainment and information. Since the wireless mobile handset is such a personal device, users are typically very selective on granting permissions to marketing companies to send data and messages to their phone.

Sponsors or brands are interested in getting their marketing messages to the handsets of users, but face significant hurdles in that customers typically dislike unwanted "junk" messages, and are unfamiliar with how to assess the success of any mobile marketing campaign. Brands, today, are eager to invest in mobile branding initiatives but they are cautious. A significant issue in mobile branding, today, is the absence of scale and trackability of metrics through third party companies. In short, the brands are ready to spend but they require actionable metrics to justify their investment. The amount of money brands will spend directly correlates with the usability of metrics, and the acceptance of handset users.

In a final example, consumers are also using portable music devices and subscription satellite radio systems for receiving audio and music entertainment. Again, these entertainment systems typically do not allow for sponsor or brand advertisement. Accordingly, there is a need for a distribution system that enables sponsors to more effectively reach targeted consumers using mobile entertainment devices.

SUMMARY

Briefly, the present invention provides a system and process for distributing branding and content messages to wireless mobile devices such as mobile handsets. The system has a mobile media portal process that enables a content owner and one or more sponsors to cooperate in negotiating, planning, and executing a branding or content campaign. For a campaign, a set of consumers has indicated a desire to receive particular content information on their mobile handset, and may have used a web interface or their phone to provide demographic information and content choices. A media center interface, either automatically or under human control, associates a particular marketing message from a sponsor with the content information, and distributes the marketing message and information to the user's handset. Since the marketing message has been selected and adapted to the demographics and preferences of the user, it is likely that the user will positively respond to receiving the marketing message.

In one example, the content owner is the operator of a sporting event, and provides content in the form of timing updates, athlete interviews, event weather, and editorial commentary. Each type of information may be considered a "channel" of content information available for publication to a user's mobile handset. Interested consumers may use a web interface to request to receive select one or more channels, and may provide demographic, handset, or carrier information as requested. The content owner may also associate with a sponsor to generate revenue, with the sponsor paying to have its marketing message distributed along with the channel information. Marketing messages are selected according to the demographics and preferences of the users, and are adapted for appeal to the selected users. A marketing message may be associated with channel information or content, so that the user that receives the channel information also receives relevant marketing messages. Since the marketing message has been adapted for that user, it is more likely that the user will be receptive to the marketing message, and is more likely to take a responsive action.

Advantageously, the present invention enables content owners to provide consumers with valuable and desired information content, while maintaining a positive relationship with the user. Also, the content owner and sponsor are able to receive timely and accurate reports regarding the metrics, effectiveness, and cost of the campaign.

BRIEF DESCRIPTION OF THE DRAWINGS

FIG. 1 is a diagram of consumer, content provider, and sponsor relationships in accordance with the present invention.

FIGS. 10 through 18 are screen representations of an example implementation of a mobile medial portal in accordance with the present invention.

DETAILED DESCRIPTION

Figure 1A:
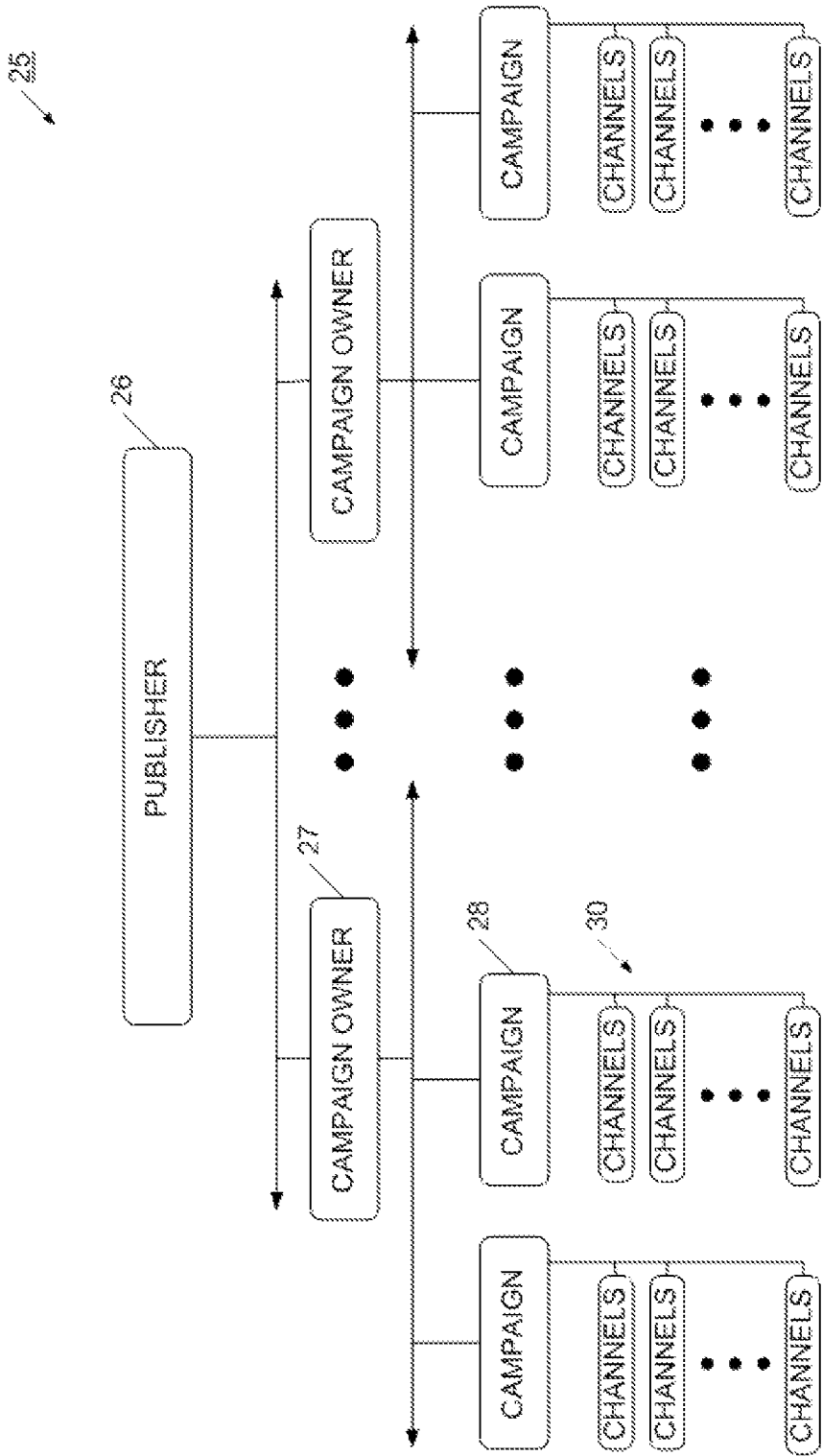
FIG. 1A is a block diagram of publisher, campaign, and channel hierarchy in accordance with the present invention.

Referring to FIG. 1, a relationship diagram shows a desirable commercial relationship 10 between consumers, sponsors, and content providers. Diagram 10 illustrates that a sponsor desires to reach a specific target consumer as shown by circle 12. The desired target market may be defined by the sponsor according to type of product being sold, its price, or other characteristic. For example, a company selling extreme bicycles (BMX) may desire to reach males between the ages of 15 and 23. More ideally, the sponsor would like to target those males that have attended an extreme sporting event, purchased a skateboard, or otherwise have indicated a willingness to spend money on extreme sporting goods or events. It is this small subset of available consumers that would most likely react to this sponsor's message, and it is the same set of consumers that is most likely to willingly receive and read or watch the message. The more accurately a sponsor may define and target an audience, and the more likely the audience will be receptive to the message, the more effective the ad will be. This target market may be defined by customer demographics, such as age, location, residence, sex, or past buying habits, for example.

Sponsors need to be aware that consumers have a limited tolerance level to advertisement messages. Today's consumers are continually barraged with commercial messages, spam, and marketing interruptions. Each consumer has a different tolerance level, and even for a particular consumer, the tolerance level may change due to the immediate circumstance. If a sponsor delivers a message to the consumer when they are over-saturated with messages, the message will not be effective in motivating the consumer to react positively to the sponsor. Similarly, the consumer may react negatively to the sponsor, feeling that the sponsor was rude, intrusive, or too aggressive. In this way, a sponsor should consider consumer tolerance and consumer permissions in setting its target markets. As more fully described below, consumers are likely to have a higher tolerance level for advertisements and messages regarding products and services they are interested in.

Consumer interest is illustrated by circle 11. Consumers are interested in seeing certain types of media content and also are likely to watch advertisements that appeal to them. In a similar manner, content providers want to reach a particularly wide audience, as illustrated by circle 14. Content may be for example, concerts, sporting events, news events, movies, videos, audio files, or other news or entertainment content. Content may also include other data, such as weather, traffic, location information, a child's progress in school, or other personalized data. Typically, content is provided as video, audio, image, or text files that are broadcast to a user's personal media device. The content may be provided in a real-time format, or it may be provided in a delayed or taped manner. The content may also be characterized according to the type of audience that the content is likely to appeal to. For example, a classical music concert may have an intended demographic of 40-60 year old married couples with high income, and who travel abroad regularly. Accordingly, a sponsor, such as an international resort agency, may search for the available content providers and request to be a sponsor for the concert. By associating content with demographic factors, sponsors are assisted in finding content that closely aligns with their marketing message.

Particular value is established at the intersection between circles. For example, overlap area 17 shows an area where sponsors are tendering advertisements that consumers are interested in hearing, reading, or seeing. These consumers have been selected according their proven message tolerance, acknowledged interest level in the message's content, or specific demographic match. In this way, consumers presented ads in overlap area 17 are highly likely to perceive and react to the ad. In one example, the messages sent to a consumer may be responsive to the specific position location of that consumer. These types of messages are particularly relevant to the consumer, and have a high likelihood of being received and acted upon. Take the instance where a consumer is walking along a street early in the morning, and a sponsor knows this consumer has previously shown interest in coffee products. The sponsor may send a coupon to the consumer's wireless handset, and invite the consumer to stop by the coffee shop a couple blocks ahead. The consumer is likely not annoyed by the message, as they are merely walking down the street, and further may appreciate knowing where a convenient coffee shop is located. The consumer may then stop by the coffee shop and redeem the electronic coupon. The sponsor may then receive a report that the coupon was redeemed. It will be appreciated that the cost of the sponsorship ad may be set responsive to the level of action taken by the consumer. This example also illustrates that messages provided to mobile wireless devices may be readily measured, either by confirming the user read the message, or by tracking a response to a message or action. By providing for measurable and actionable metrics, a sponsor is confident in the value, reach, and impact of an advertising campaign.

In a similar manner, when content overlaps what consumers want to view, overlap area 18 shows that consumers are likely to register for, pay for, and watch content. Finally, overlap area 19 shows where sponsors have advertisements which meet the quality standards and commercial goals of content providers, and the content is likely to attract the type of audience that the sponsor is looking for. A particularly valuable overlap area 21 is established where content is mutually associated with advertisements, and consumers are interested in both the content and the advertisement. For example, if a skateboarder is watching a skateboard competition and a Tony Hawk commercial interrupts the contest, it is highly likely that the consumer will continue watching the advertisement. These high value marketing impressions are of great commercial value. Further, the mobile wireless handset enables the sponsor to form a one-to-one relationship with a consumer. The sponsor may confirm that a particular individual watched a commercial message, invite and receive a response from that individual, and measure actions taken by the user. Such an intimate and personal relationship is enhanced through the use, by permission, of the user's personal mobile handset.

Generally, then, the method and system provided herein enables an efficient and effective matching of consumer interests, sponsor offerings, and content availability. In this way, content and sponsors are presented to consumers with the highest likelihood that the consumers want the ads and content, and will view and respond to the advertisements. For example, the consumer may respond by immediately placing a voice call or sending a text message, by redeeming an electronic coupon, or by purchasing a product or service. The consumer may also initiate a wireless Internet session, or may purchase an offered product at a later time, using either the wireless device or a traditional computer interface. Each of these responsive actions provides an avenue for measuring an individual user's reaction to a commercial message. The derived metrics are useful to the sponsor in evaluating effectiveness of the sponsorship campaign, and may also be used as a demographic, which will assist in more accurately providing users with useful and actionable information in future campaigns.

In managing the customer relationship, it is important that the sponsors and content providers properly respect the consumer and the consumer's information. The consumer has trusted the sponsor and content provider enough to give up some level of personal or demographic information. Accordingly, the sponsor and the content provider must not be seen by the consumer as preying on the consumer, but must be perceived as adding value to the consumer's life. If the sponsor or content provider abuses the consumer or their information, the consumer will quickly stop responding to the sponsor and content provider, and may even develop long-term negative impressions.

In matching consumers, sponsors, and content, a mobile media portal system is provided. The mobile media portal is a software application or series of related applications that enable a sponsor to reach a narrowly defined set of consumers with particularly useful and desired commercial messages and content. The mobile media portal may operate on one or more general purpose computers, or may operate on systems particularly designed for this purpose. As illustrated in FIG. 1A, the mobile media portal solution 25 is operated or managed by a publisher 26. The publisher 26 is responsible for administering the operation of the mobile media portal solution 25. The publisher 26 may be, for example, an advertising agency or a company with a popular and valuable brand. A publisher 26 is able to administer several campaign owners 27. A campaign owner 27 may be, for example, a division of company, a group in an ad agency working for a particular brand or the content provider. In a specific example, a content provider operates a sporting event, and offers several types of content information for distribution. In this example, the sporting event acts as the campaign owner 27, and is able to define what content will be distributed, what set of consumers the content will be sent to, and what marketing messages are to be associated with their content. In some cases, the campaign owner 27 will also be the publisher.

Each campaign owner 27 is able to direct several campaigns 28. These campaigns 28 may be run concurrently or consecutively, and are used to deliver content to users. Also, the delivered content may have associated marketing messages that may be directed to influencing a target audience regarding specific products or services. Each campaign 28 may have multiple channels 30 of content. Each content channel is typically designed to deliver a particular type of content or data to a consumer. For example, a campaign organized around a sporting event may have a weather channel, a real-time score update channel, and an extra-curricular channel. A consumer typically selects which channels they want to receive, and the campaign associates desirable and relevant commercial messages with the channel content. In this way, a consumer receives requested channel content along with messages targeted to that user's preferences and characteristics.

Figure 1B:
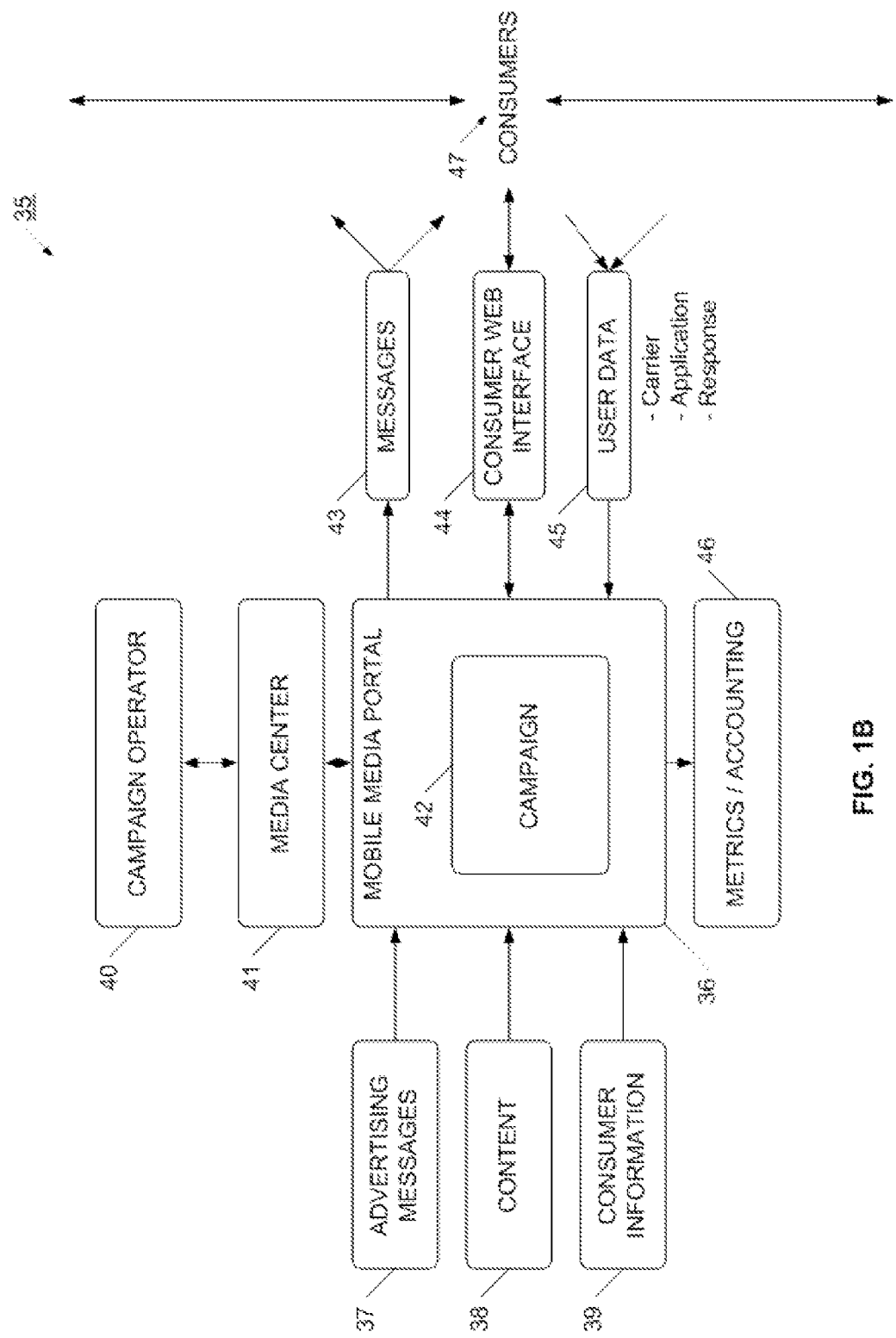
FIG. 1B is a block diagram of a media marketing system in accordance with the present invention.

As illustrated in FIG. 1B, a mobile media portal system 35 operates a mobile media portal application 36. The mobile media portal application 36, as described with reference to FIG. 1A, may operate with many individual campaigns, such as campaign 42. A campaign operator 40 manages the campaign 42. Typically, the campaign operator 40 is a human, but may be supplemented or supplanted with adaptive automatic control. The campaign operator 40 interacts with the mobile media portal 36 through the media center 41 interface. The media center 41 allows the campaign operator to 1) select and define a target consumer set using consumer information 39; 2) select and distribute content 38 to the selected consumers; and 3) associate desired and relevant advertising messages 37 with the content. The selected content 38 and advertising messages 37 may then the sent as one or more messages 43 to the selected consumers 47. The consumers 47 will view or use the content data, and will see and react to the advertising message 43. Depending on the particular reaction made, user data 45 may be collected regarding the consumer's reaction to the advertising message 43. The user data 45 may be used to derive success metrics and reports 46, or settle monetary accounting. The mobile media portal system 35 thereby enables an effective, targeted, and measurable advertising campaign.

In system 35, the advertising messages 37 may be text, video, audio, or images, and may be manually or automatically adapted to fit the user demographic of the target consumer set. The content 38 may be real-time data, a movie, a concert, a sporting event, an audio track, news event, or other content that a user would find informative or entertaining. Consumer information 39 may be received from a consumer that signs-up or subscribes through a consumer web interface 44, and may contain data collected from previous interactions or other sources. Some non-personal information may be received from the carrier that the consumer uses for their wireless handset. For example, the carrier may be able to provide information regarding type of handset used, type of calling or data plan used, applications operable on their handset, and general geographic information. This information may be useful in selecting what information to send to a consumer, as well as formatting the information for better viewing or interaction of the user's particular handset. In one example, the mobile media portal can remove graphical information from messages sent to a text-only handset. In another example, an ad may include a live Java applet if the handset is known to have an operating Java virtual machine.

Figure 2:
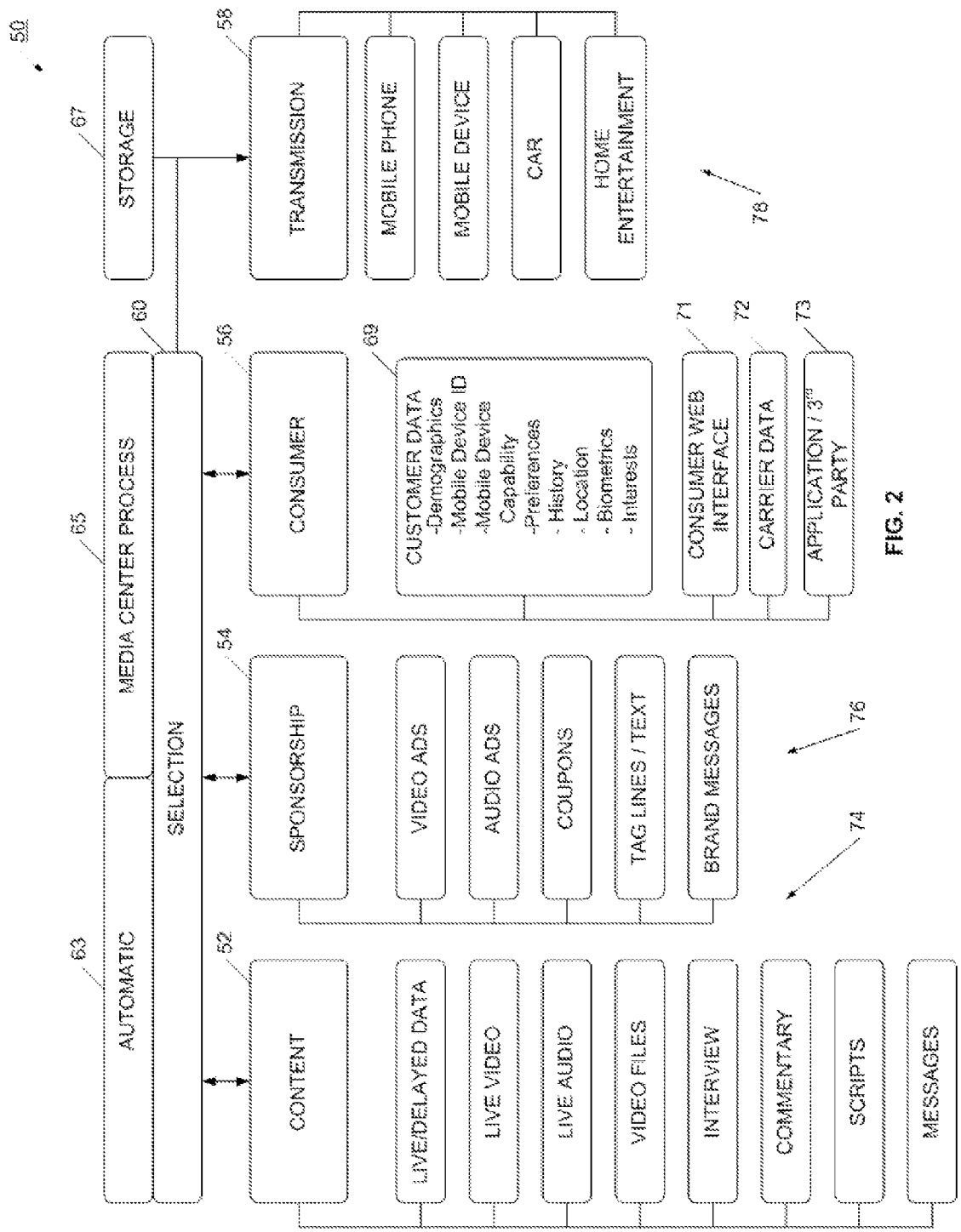
FIG. 2 is a block diagram of a mobile media portal in accordance with the present invention.

Referring now to FIG. 2, a mobile media portal system 50 may be a combination of hardware and software systems for enabling the association of content and sponsors in a way highly likely to appeal to targeted consumers. In this way, consumers are likely to receive content and advertisements that interest them, thereby increasing the probability that the consumer will perceive and react to the sponsor ad. Although the mobile media portal 50 is illustrated as a single system, it will be appreciated that the mobile media portal 50 may be implemented as a distributed system, with certain aspects operating on one computer system, and other aspects operating on one or more other computer systems. It will also be appreciated that the mobile media portal 50 may receive its information, (content, consumer information, sponsor messages, etc.) through networks, by physical input, by automatic or electronic data feeds or connections, or through physical media. Mobile media portal 50 has a content provider that provides content or content files 52. This content 52, may be, for example sports timing data, live video, live audio, video files, interviews, commentary, inspirational messages, health tips, training prompts, educational messages, scripts, or other messages. Mobile media portal 50 also has sponsor messages 76. Sponsor messages 76 may be for example, video advertisements, audio advertisements, brand messages, coupons, or tag lines that are to be associated with content information 52. These sponsor messages 76 are then made available to the mobile media portal 50 in sponsor file area 54. Consumer and distribution information 56 is also available to mobile media portal 50. Consumer data 69 may include consumer demographic data, mobile device identification information, mobile device capability information, geographic location, and preferences for the consumer. Consumer data may be collected from various sources, for example, a consumer web interface 71 may be provided where consumers sign up for events, games, or participate in some other registration process where basic consumer information is collected. Other consumer information may be collected from other third parties or applications 73, or may be collected or derived from carrier data 72. It will be appreciated that carrier data 72 may include information from other entities in the mobile message distribution path, such as aggregators or message routing companies. Mobile media portal 50 thereby has content files 52 sponsorship files 54, and consumer files 56.

A selection process 60 is then used to match particular content 52 with particular sponsors 54 for distribution to a targeted subset of consumers 56. In this way, the content is paired with ads, and both the content and ads are targeted to the specific group of consumers most likely to enjoy and watch the content and ads. The selection process 60 may be done manually through a media center process or interface 65. A media center process 65 may be in the form of a computerized user interface for use by a human operator. The human operator, may be a campaign operator, magazine publisher, radio program director, or TV program director, for example. The media center 65 manages delayed or live content, and matches the content with sponsors who have paid for exposure or marketing impressions. The operator of the media center, in a near real-time environment, is able to monitor available content, available sponsors, and track consumers, to dynamically generate and distributed messages to target consumers. In another example, the selection process 60 may have automatic features 63 or may be fully automated. In this way, an automated or live channel process selects particular content or portions of content, attaches particular ad or ads, and selects consumer subsets likely to have interest in the content and sponsorships.

The messages are then packaged for transmission to the consumer. In one example, a storage system 67 is provided for delayed transmission of the content. In a specific example of delayed programming, messages may be arranged into an on-going training program, inspirational program, faith program, or other on-going marketing program. In this way, messages are predefined, but are transmitted over time according to a time schedule. The storage 67 may also be arranged to facilitate an on-demand feature. In this way, consumers may be made aware that programming is available for viewing, and then use video player like controls to start, stop, pause, or rewind content. The messages, whether distributed in real-time or through a delay, are transmitted to the consumer through a transmission system 58. The transmission system 58 may include wireless service operators, wireless infrastructure operators, aggregators, and message routing services. The distribution of messages and media to personal media devices is well known, so will not be discussed in detail. Personal media devices 78 may include, for example, media enabled mobile handsets, other mobile devices such as music players or personal data assistants, vehicles such as cars or commercial delivery vehicles, and home entertainment systems and devices.

Figure 3:
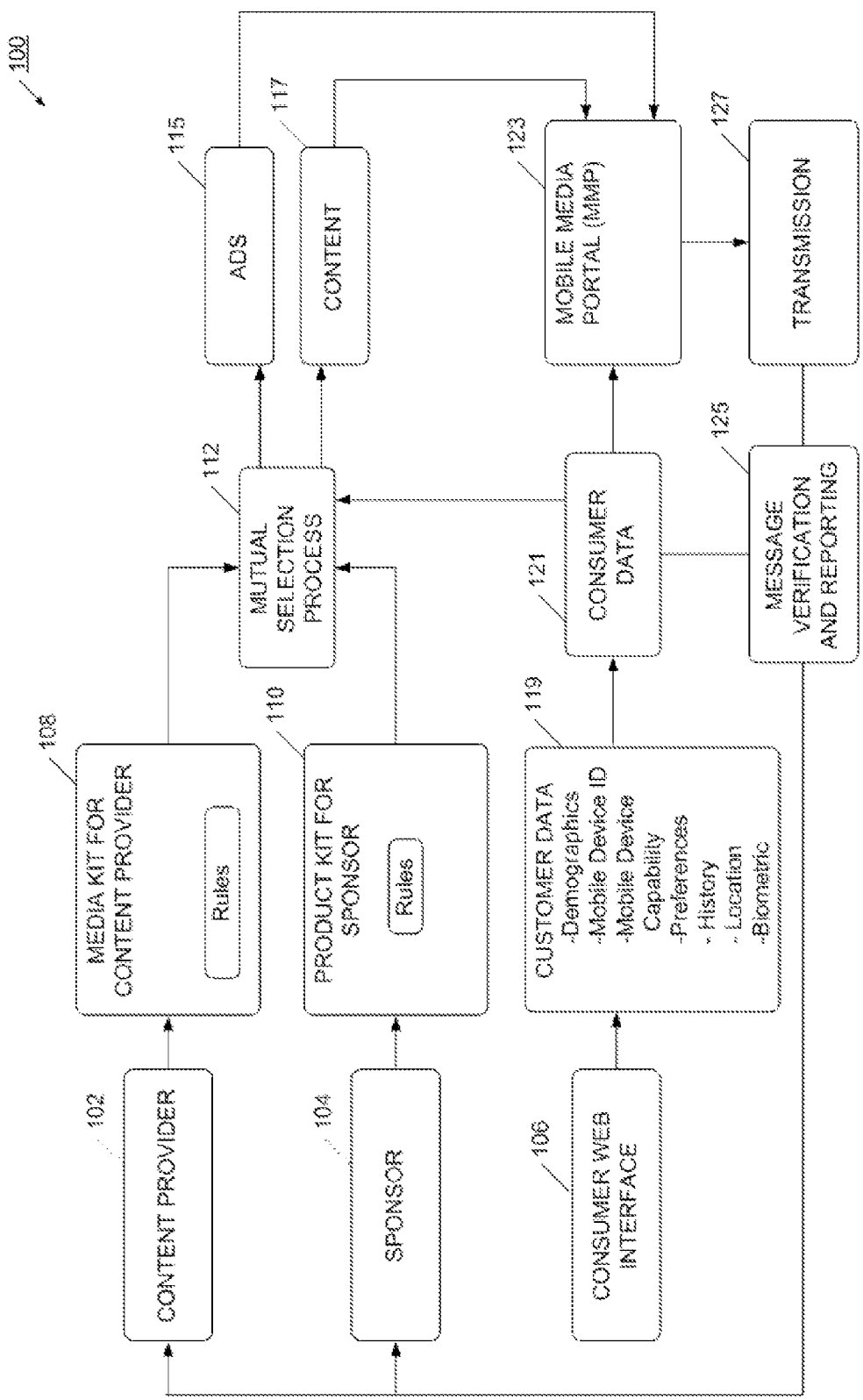
FIG. 3 is a block diagram of a media distribution system in accordance with the present invention.

A mobile media portal system may include or be associated with a matching process to facilitate the introduction and coordination of sponsors and content providers. Referring now to FIG. 3, a media distribution system 100 is illustrated. Media distribution system 100 has a content provider 102 that generates a media kit 108 setting out the information regarding content the provider has to offer. For example, the content provider 102 may complete the media kit 108 to indicate that it is offering a sporting event at a particular time, place, and date. The media kit 108 may also set out the anticipated audience for the content, and define the target audience according to demographic characteristics, such as age, location, sex, and income level, for example. The media kit 108 may also define other known information about the target audience, if known, such as type and capability of handsets used, carrier information, and types of active data plans. This type of data, which might be received through cooperation with one or more carriers, aggregators, third-party applications, or on-line source, is useful for understanding the types of messages that may be conveniently and receptively sent to a set of users. The content provider 102 may also provide certain rules for using its content. For example, if the sporting event is a little league championship, then one rule may exclude tobacco, alcohol, adult or political advertisements from its allowable types of sponsors. Distribution system 100 may provide an electronic framework or interface for the media kit 108. For example, the content provider 102 may access fillable forms through a web site interface, and thereby be assisted in completing a proper media kit and rules.

In a similar manner, a sponsor 104 may be assisted in generating a product kit 110. The product kit 110 may also set out the anticipated audience or market for the product, and define the target market according to demographic characteristics, such as age, location, sex, and income level, for example. The product kit 110 may also define other known information about the target audience, and may indicate a preference for the type and format of content. The sponsor 104 may set out the type of ads that it would like to present, and also may specify particular rules. For example, a sponsor proposing cosmetic ads may not want to have those ads displayed for any football, baseball, or hockey sporting event. By allowing sponsors and content providers to provide rules, the distribution system 100 enables content providers 102 and sponsors 104 to control quality of their product and messages as perceived by the consumer. Distribution system 100 also has a mutual selection process 112 for assisting content providers 102 and sponsors 104 in association for a media campaign. In one example, the mutual selection process 112 compares rules and desired pairings from kits 108 and 110, and invites the content provider 102 and a sponsor 104 to begin a campaign development proposal. The content provider 102 and sponsor 104 may then iteratively define ads 115, scripts, messages, coupons or other marketing programs to associate with particular content 117. For example, the content provider 102 may agree that a particular sponsor 104 may add a message tag line every time an inning of a baseball game ends and the scoreboard is shown. In this way, the content 117 would indicate that each time the scoreboard is shown at the end of an inning, a particular predefined tagline 115 is to be sent. The content 117 and ads 115 are then forwarded to a mobile media portal system 123 where the ads and content are associated with a particular target consumer, and the ads are distributed. Although the MMP 123 is illustrated as a separate external process, it will be appreciated that the matching process may be included as an integrated module within the MMP 123. In one example, MMP 123 may be similar to the mobile media portal system 50 described with reference to FIG. 2.

Consumers may provide customer data 119 for the distribution system 100 through a consumer web interface 106. The consumer web interface 106 allows a consumer to register, play a game, or otherwise provide information into the system as shown in block 119. It will be appreciated that a consumer interface may also be provided on a personal media device, handset, or may collected by interview or other method. The customer data 119 may include, demographic information such as age, sex, and residence location, and would include information regarding the personal media device. Information may also include biometric data, such as weight, that can be combined with other data to more particularly define messages. The information may also include position location information that may change if the user is mobile. It will be appreciated that consumer demographic information may be collected, purchased, or otherwise obtained using known processes, or may be collected or derived from the user's carrier, for example. The mobile media portal 123 (or the distribution system) needs to know how to individually address a user's device, so customer data 119 includes information on how to address and send messages to each consumer's device or devices. The mobile media portal 123 also desirably understands the capability of consumer devices. For example, some devices require reduced resolution video, while others may support much higher resolutions.

Selected consumer data 121 is made available to the mobile media portal 123. In this way the mobile media portal 123, either in real-time or after a delay, may associate ads 115 and content 117 with a subset of consumers and generate messages for distribution. These messages are then forwarded to the transmission system 127 for transmission or broadcast to consumers. Some personal media devices have a reporting function for indicating that the consumer has actually opened and probably viewed a particular message. If such a case, the distribution system 100 may collect the information, and provide verifications and reports 125 that content and ads were opened and likely viewed by the consumer. Verification may also be collected or derived from other consumer activities, such as placing a call, sending a message, forwarding a message, making an on-line purchase, or derived from information received from a carrier/aggregator or third-party application.

Figure 4:
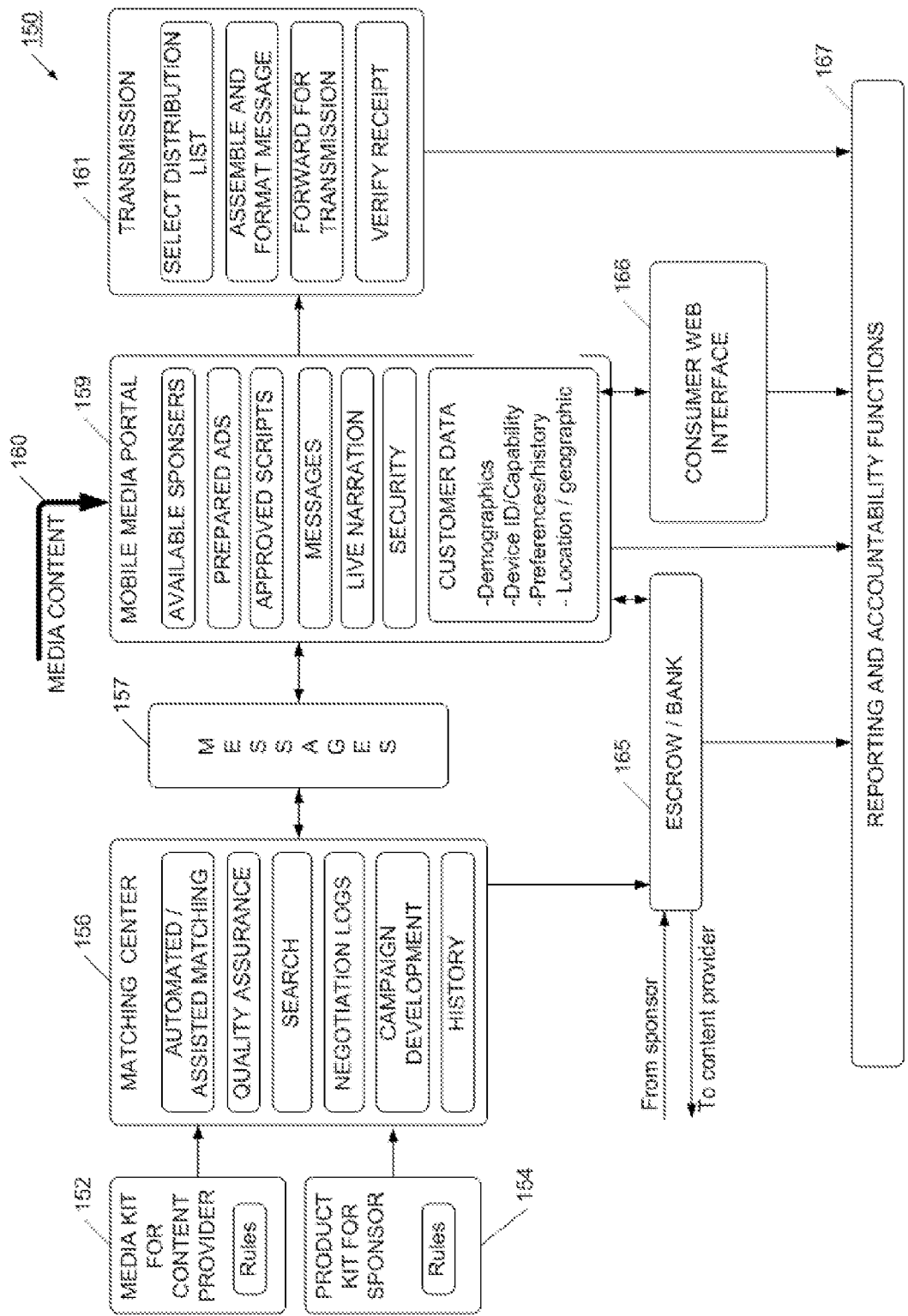
FIG. 4 is a block diagram of a media distribution system in accordance with the present invention.

Referring now to FIG. 4, a media distribution system 150 is illustrated. Media distribution system 150 has a media kit 152 provided by a content provider. The media kit 152 for the content provider may include rules on how the content provider wants its content controlled, distributed, or limitations on the types of sponsors and consumers that are to be considered. A product kit for sponsors 154 is also generated by potential sponsors. The sponsors may also have rules on how they want their product presented and how it is to be associated with content. The system 150 may provide fillable forms, questionnaires, or other automated assistance to the content providers and sponsors for completing the media kits (152, 154). Desirably, the media kits (152, 154) are in a standard format for improved automatic matching and processing.

The media kits (152, 154) are received into a matching center 156. The matching center 156 has an automated or assisted matching function for associating particular content providers with matching sponsors, and for matching particular sponsors with matching content providers. The automated or assisted matching program may contact, email or otherwise notify content providers and sponsors that a potential match is possible. It will be appreciated that messaging processes such as email or instant messaging may be operated within the system 150, or the system 150 may connect to standard external messaging processes. The matching center 156 may have negotiation logs which enable recording transaction history between the content provider and sponsor. These negotiation logs may assist and facilitate negotiations, as well as provide an accurate historical perspective of the interaction between the content provider and the sponsor. During the negotiation process, the content provider and sponsors may agree on additional quality assurance controls. For example, they may agree that advertisement cannot exceed more than 5% of the time that content is being presented. These quality assurance rules may then be used by the mobile media portal 159 for further control of the distribution of messages.

The matching center 156 may also include campaign development tools. For example, matching center 156 may have campaign development tools enabling a sponsor to propose advertisements, messages, and coupons, and enable the content provider to approve those messages or other ads, or propose changes. In this way, the campaign development process may be run simultaneously with the negotiation process, thereby making the matching and development process more efficient. As a result of this iterative process of campaign development, a set of advertisements, scripts, or messages may be developed. These sponsor messages 157 are then made available to the mobile media portal 159, where the messages are automatically or manually associated with content, and messages distributed to handsets for a targeted set of consumers. In one example, mobile media portal 159 is similar to mobile media portal system 50 described with reference to FIG. 2.

When media content 160 is available, the mobile media portal 159 is able to select from the available video, audio, images, or text messages 157 to attach and associate with content 160 or portions of the content 160. During distribution operations, the mobile media portal 159 has a list of available sponsors, prepared advertisements or messages that have been preapproved by the sponsor and content provider, and other information such as commentary to attach to content 160. The mobile media portal 159 may also facilitate a live narration or commentary to accompany the media content 160.

Security controls may also be in place, for example, by limiting the distribution of messages to adults only. The mobile media portal 159 also has access to customer data, such as demographic information, and device identification and type. In this way, the mobile media portal is able to select and parse content, added additional narrative or commentary to the live content, associate particular ads, and distribute generated messages to a specific targeted audience. This enables the mobile media portal 159 to identify particularly high-value consumer targets, and timely provide them with desired and useful information. The generated messages are then sent for transmission 161. In some cases, full device identification and mobile device capability may not be available to the mobile media portal 159, as it may be under the control of the transmission service provider. In this case, the transmission provider would be passed a distribution list as well as a message to be distributed. The transmission system 161 would then format the messages according to device capability, and distribute the messages to the list of target consumers. If the consumer device supports verification, then the transmission system 161 would also verify that messages were received by the particular consumers.

The distribution system 150 may also include monetary and accounting functions. For example, part of the matching center process 156 may include the content provider and sponsor agreeing on a cost and cost basis for the marketing program. More specifically, the sponsor may agree to pay a per-impression price for each consumer that is verified to have received the sponsor message. Upon agreeing on the likely cost of the program, the sponsor may place into an escrow bank 165 a retainer or other agreed upon amount of money. The mobile media portal 159 is also aware of the amount of money in the escrow bank, and restrictions can be placed on the number of ads distributed according to the amount of available funds in the escrow bank. For example, the sponsor may not be allowed to have any more ads run, if the escrow bank goes to zero. The transmission system 161 is tied into reporting and accountability functions 167. In this way, when the transmission system has verified that a consumer has received a particular sponsor's message, then the agreed-upon amount may be deducted from the escrow bank, and the money forwarded to the content provider. In this way, a sponsor is assured that it only pays for valuable market impressions, and payment is not finalized until messages have been confirmed to have been received.

In another example, the sponsor and content provider may agree on a multi-tier cost basis. In this way, the sponsor will pay a smaller amount if a consumer perceives the message, and a progressively larger amount depending on how the consumer reacts. In this way, the mobile media portal supports dynamic and adaptive costing or revenue sharing according to measured consumer response. The consumer response may be seeing the message, making a desired message response, making a call, going to a website 166, redeeming a coupon, or making an online purchase. For example, if the consumer responds with a text message, the sponsor may pay a premium amount, and if the consumer redeems a coupon, may pay an even larger amount. By enabling such a tiered and accountable message system, a sponsor is able to more accurately relate its marketing expenditure to consumer response.

This dynamic costing system can be extended to a relative ranking and cost for particular types of consumers. For example, since the mobile media portal 159 is aware of how a particular consumer has reacted in the past, the value of that consumer may be set according to past response. Take for instance the consumer that has never redeemed a coupon or made a verified purchase in response to a perceived message. Accordingly, that consumer may have a low valuation, even when they open and perceive a message. However, there may be a substantial premium attached to this consumer if a message causes this consumer to actually respond to a message. In another example, the set of highly responsive consumers may have a very high valuation, although care must be taken not to exceed their level of message tolerance.

Figure 5:
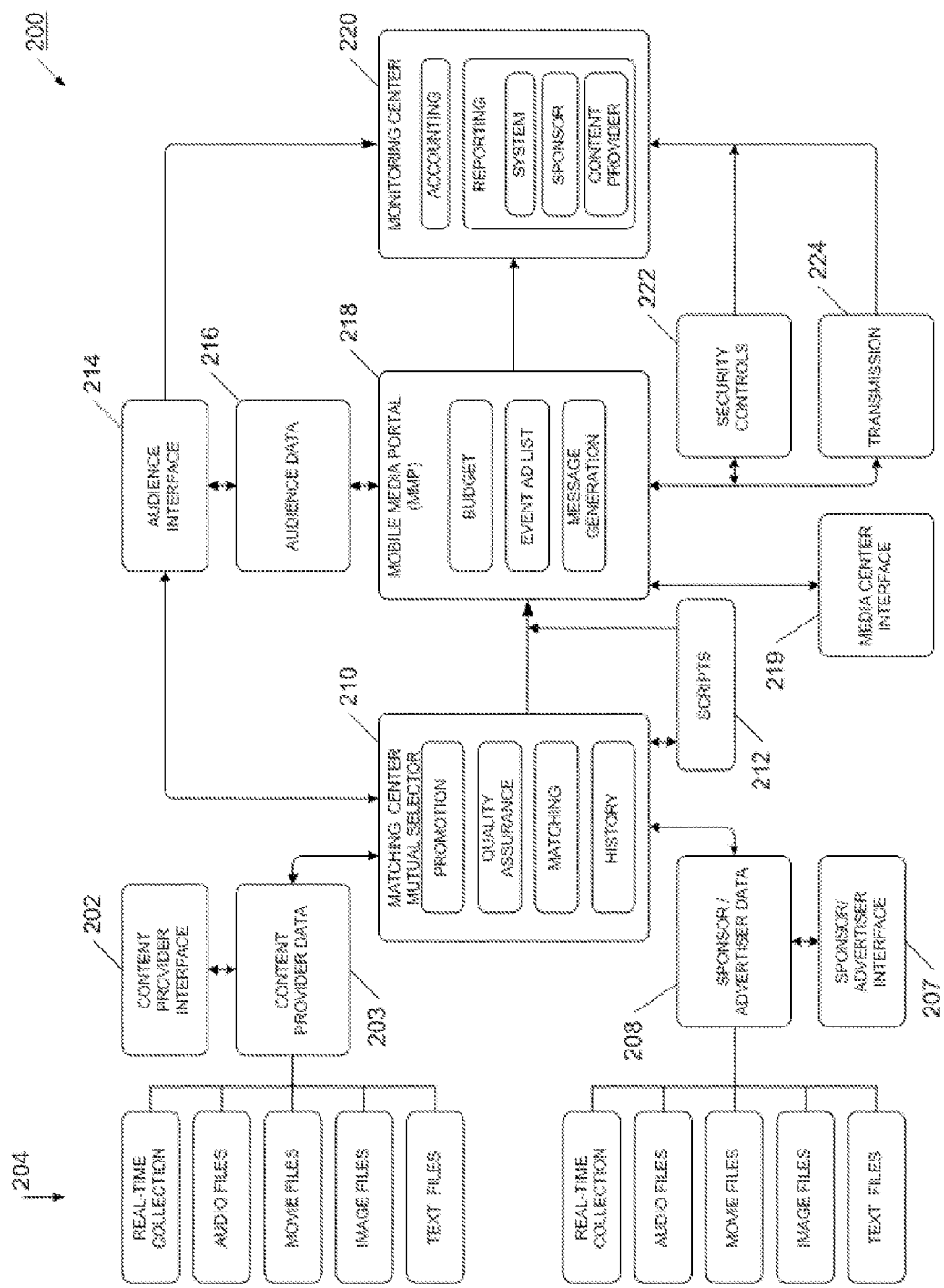
FIG. 5 is a block diagram of a media distribution system in accordance with the present invention.

Referring now to FIG. 5, another media distribution system 200 is illustrated. Media distribution system 200 has content 204 provided as a content data 203. The content provider data 203 may include content provider information that the content provider provides through a user interface 202. In this way, the content provider may provide detailed information as to the type of content it is providing, as well as specify the types of target audiences and sponsors with which it wishes to be associated. The content 203 may be real-time information, audio files, movie files, image files, text files, or other entertainment or news information. The sponsors also provide sponsor information 209 into a sponsor data file 208. The sponsors may use an interface 207 for providing information regarding its target audiences, and the type of content with which it wishes to be paired. The information regarding the sponsor 208 and the content 203 is provided into a matching center 210. The matching center 210 provides automated or assisted matching processes for matching particular content providers with particular sponsors. Part of the process of matching may also include developing scripts 212 or other messages and ads for use during the actual campaign. These scripts 212 or other marketing messages are then available to the mobile media portal 218 at time of distribution.

Mobile media portal 218 may be automated, or may have a media center interface 219 that enables a campaign operator to control broadcasting and message distribution functions. The media center 219 may be used to associate specific content with specific advertisements to be transmitted to a target audience. The audience data 216 has been collected, for example, through an audience interface 214. This audience interface may include information regarding content or sponsors, for example, if they are offering contests and games to encourage consumers to register. The messages are then distributed to the target consumers, and the market monitoring center 220 then accommodates accounting and reporting functions. For example, the monitoring center 220 may be made aware of actual receipt of message files by consumers. This receipt information may then be used to generate reports, financial, and accounting functions in an automated fashion.

The monitoring system 220 may also feed information back into mobile media portal 218. For example, security controls 222 may indicate that some consumers do not want to receive the messages or content, or may adjust the types of messages sent to particular consumers. The transmission system 224 may also feed information back to the mobile media portal 218, to allow the mobile media portal 218 to work more efficiently. For example, if messages are not being timely delivered, then the mobile media portal 218 may make adjustments in the type of content or ads being distributed to improve timeliness of the messages.

Figure 6:
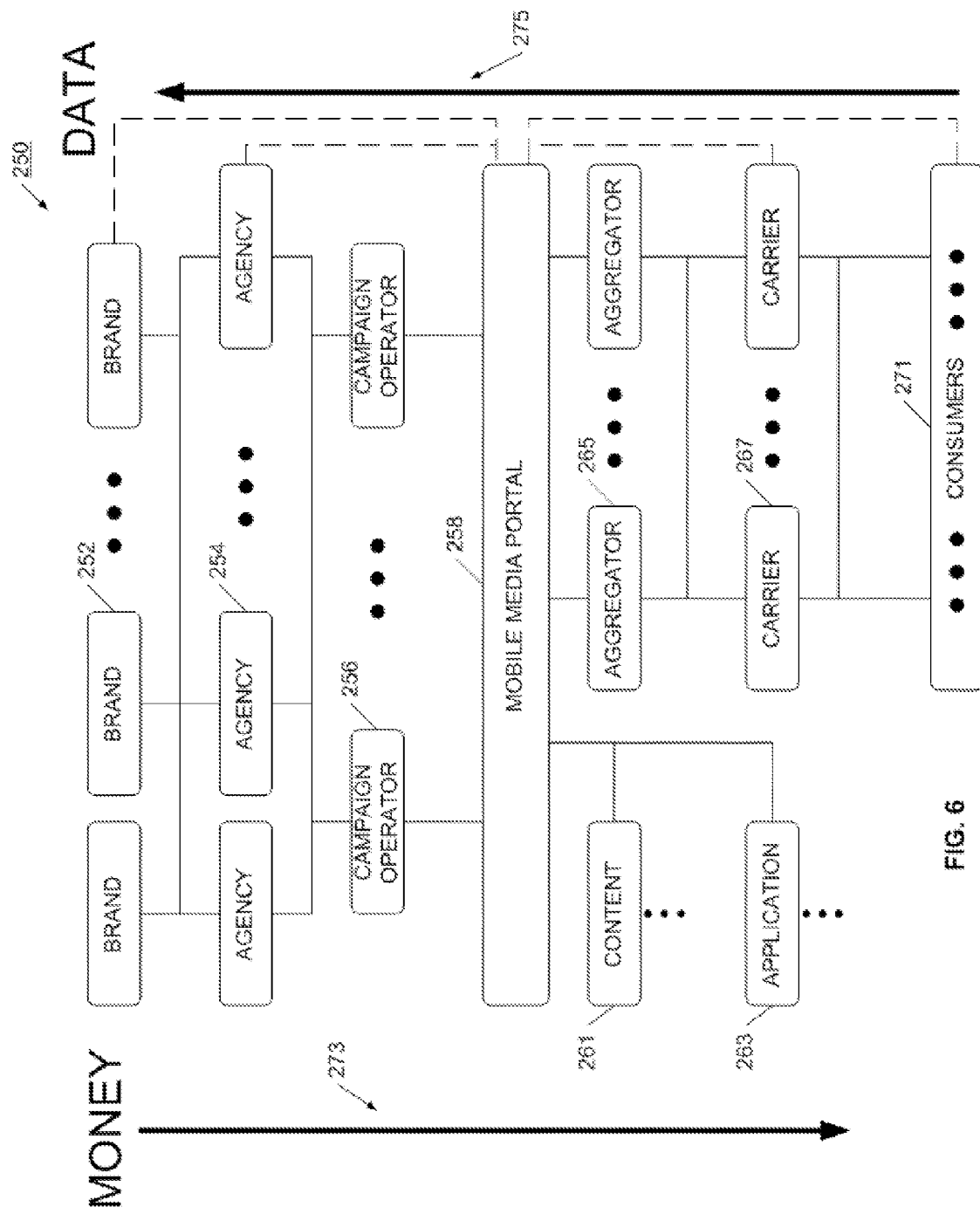
FIG. 6 is a block diagram of money and data flow in a media distribution system in accordance with the present invention.

Referring now to FIG. 6, a model 250 of how a mobile media portal may generally manage money 273 and data 275 is shown. In a traditional delivery of content to a user's wireless mobile handset, the user selects content, such as a song or wallpaper, and pays the carrier for the content as well as for delivering the purchased content to the handset. The carrier (or an agent of the carrier), distributes some of the money to the owner of the content or to other third party applications that assisted in providing the content. This traditional model places the carrier as the primary manager of the money, and has limited the distribution of content and data services to handsets, as well as insulating brands from direct contact with the users.

The model 250, enabled by the mobile media portal enables a brand to have greater control over the messages that end up in the hands of target consumers, allows the brand to pay for messages and content to be delivered to those users, and allows the brand to more accurately assess the effectiveness of their marketing campaign. In a similar manner, model 250 enables a content owner to have greater control over how messages are associated with their content, allows the brand to pay them for the content, and opens up a wide and convenient method for distribution. In model 250, which is just one of many possible commercial relationships, the brand 252 hires one or more agencies 254 to execute a target mobile messaging campaign. The agency 254, either directly or indirectly, has a campaign operator 256 that interacts with a mobile media portal 258 to define and execute the marketing campaign. The mobile media portal 258 is used to select target consumers, choose content 261 or applications 263 likely to be desired by the target consumers, and association appropriate branding messages with the content. The mobile media portal 258 cooperates with aggregators 265 and carriers 267 to deliver the messages to each targeted consumer 271. Using this model 250, the brand 252 is enabled to pay the agency 234, operator 256, content provider, aggregator 265, and carrier 267 to deliver the desired content and marketing message directly to an individual user.

Data 275 may also be retrieved directly from the consumer 271, the carrier 267, and the aggregator 265 or third-party application. The data 275 may be used by the mobile media portal 258 to adapt the current marketing campaign, adjust the next campaign, or used to support reporting to the agency or brand. The data 275 may also be used to support accounting and settlement between the brand 252 and any of the other entities. For example, the brand 252 may pay a premium to a content owner if certain action benchmarks are met, or the brand may only pay a carrier for confirmed delivered messages.

Figure 7:
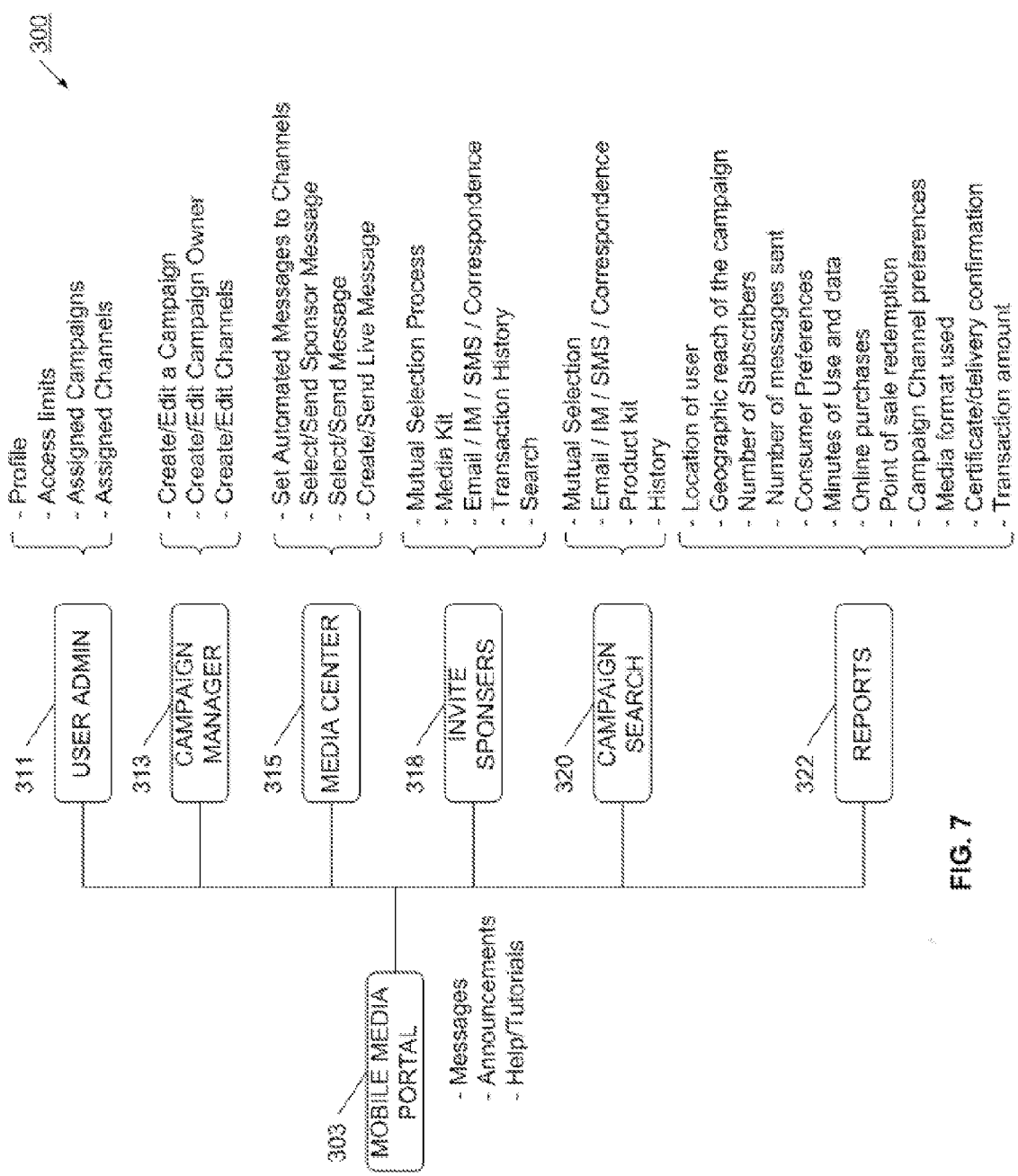
FIG. 7 is a block diagram of a menu hierarchy for a mobile media portal application in accordance with the present invention.

The mobile media portal may be constructed as one or more software applications operating on a general purpose computer system. FIG. 7 shows one example of how a menu structure 300 for a mobile media portal may be arranged. It will be appreciated that the mobile media portal may be implemented in many different forms consistent with this disclosure. Menu 300 has a home page 303 that is used to access messages, receive or send announcements, and receive help or tutorial information. The home page 303 also allows an authorized administrator to select other top level functions, such as user administration 311. The user administration function 311 allows a system administrator to define profiles for users, set access limits, and generally manage the mobile media portal application. The user administration 311 function may also allow a system administrator to define which users may view, create, or edit specific campaigns, as well as define which users may view, create, or edit specific channels.

Authorized users may use the campaign manager 313 function to create or edit campaign owners, campaigns, and channels. For example, an authorized user may define which channels will be used in a particular campaign, and select and form advertising messages to be used in support of a particular sponsor. Once campaigns and channels are defined, an authorized user may use the media center 315 function to manage the selection and distribution of content and messages to selected wireless handsets. The media center 315 may have functions for automatically populating live channels, or may include facilities for manually sending messages.

The mobile media portal may also integrate or connect to processes for inviting sponsors 318 or assisting in the development of campaigns. The invite sponsor 318 function may include automated, partially automated, or manual functions for mutually matching sponsors and content providers. Matching may include assistance in creating and presenting media/product kits, and facilities for managing correspondence between sponsors and content providers.

The mobile media menu 300 also allows a sponsor to perform a campaign search 320. Using this feature, a sponsor is able to search for historical or active campaigns that match with the appeal of that sponsor's product or service. Automated search routines may use demographic or preference information in the sponsor's product kit, or the search may be performed manually. By identifying existing campaigns of interest, the sponsor is able to identify content providers that may be interested in developing a future campaign using the sponsor's marketing messages. In some cases, the sponsor may also be looking for active campaigns to immediately participate in.

The menu 300 may also provide report 322 functions, which allows collected data to be analyzed and presented. The reports may be printed, or may be electronically provided to other local or remote processes. In this way, measured consumer response may be used to adapt local or remote processes, for example, the cost of impressions. As illustrated, there are many types of metrics and reports that may be generated according to campaign requirements.

FIGS. 8 through 18 illustrate screen representations of a software application implementing a mobile media portal and distribution system. These figures are only representative of one possible implementation, and it will be appreciated that many other implementations and designs may be used in accordance with the systems and process described herein. Each figure is briefly described below.

Figure 8A:
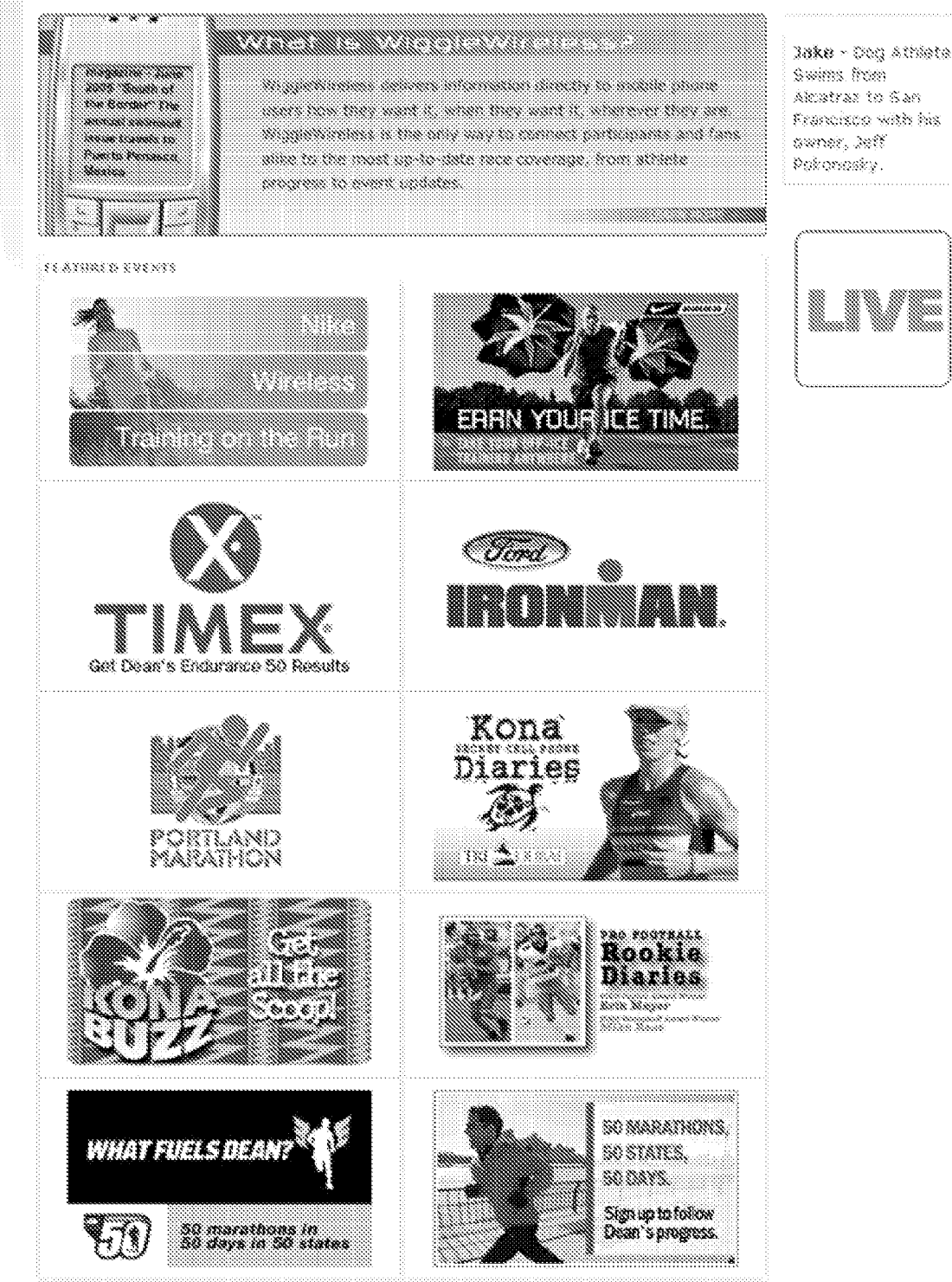
FIGS. 8A, 8B, and 9 are screen representations of a consumer web site interface for a mobile medial portal in accordance with the present invention.
Figure 8B:
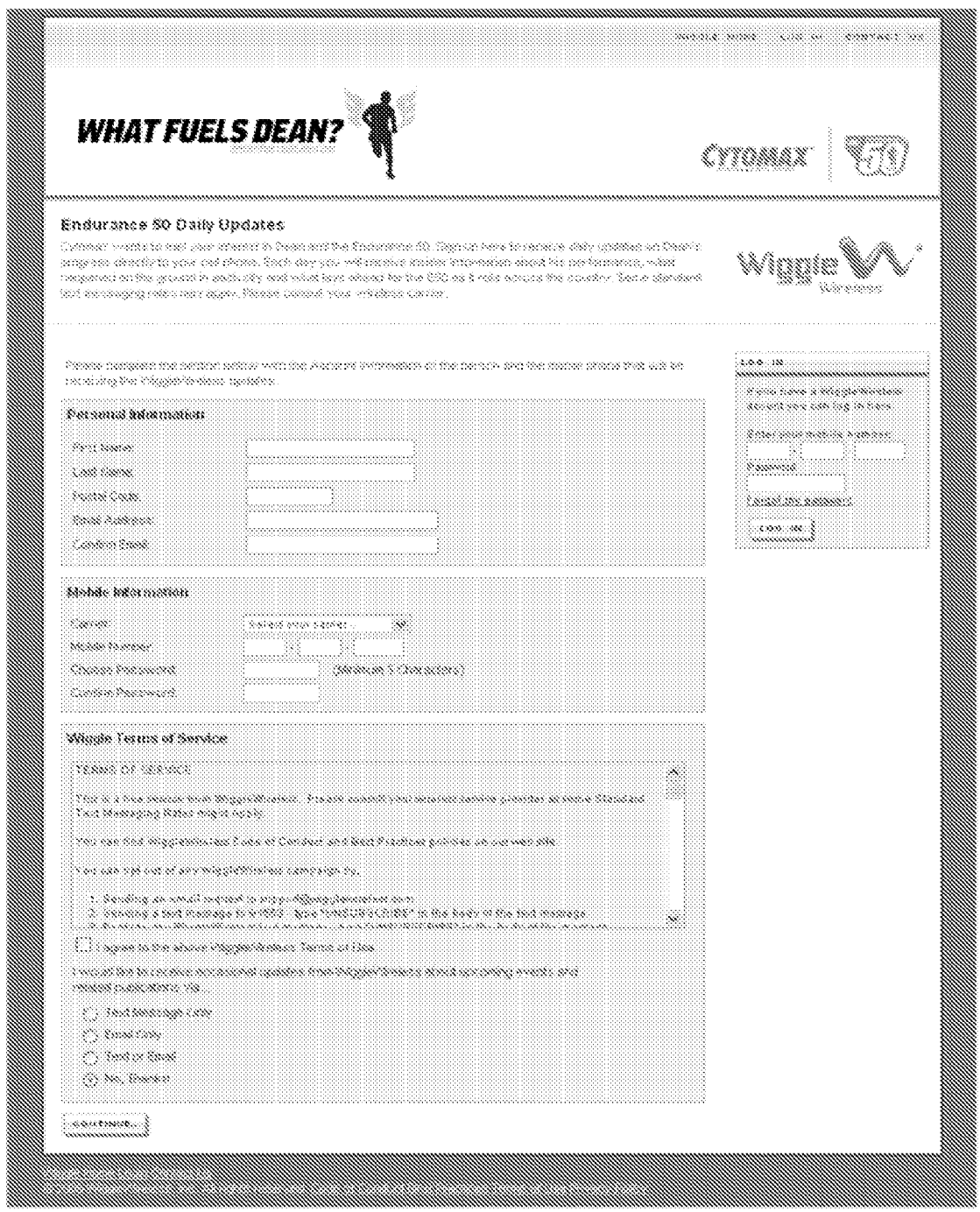

FIG. 8A shows a home page for a consumer web interface that invites visitors to request interesting content information. The specific illustration of FIG. 8A is directed to users having an interest in extreme sports such as Ironman® competitions and marathons. Consumers are draw to this site due to its ability to direct high quality, interesting, and timely information directly to the use's handset. FIG. 8A also illustrates an initial association between the desired content (e.g. Ironman®) and sponsors having products that are likely to interesting to the user (e.g. Timex® products). In order to receive specific content, the user first is directed to a subscription pages, such as the page illustrated in FIG. 8B. The page of FIG. 8B allows a consumer to enter personal information such as name, location, and other demographic information, as well as other preferences. It will be appreciated that a wide variety of information may be collected using such an interface. The web interface also allows collection of mobile handset information such as mobile number and carrier. It would also be possible to collect information regarding the capability of the user's phone, or in some cases, that information may be obtained from the carrier.

Figure 9:

FIG. 9 shows a consumer web interface that allows a user to select specific channels of information. For the channels selected, particular information will be sent to the user's mobile handset. For example, if the user selects the "Norman Stadler" channel, the user can expect to receive 2 or 3 messages a week to their mobile handset, with each message having information regarding Norman's preparation for the next Ironman® competition. As described previously, selected and targeted marketing messages may also be sent along with the channel informational messages.

Figure 10:
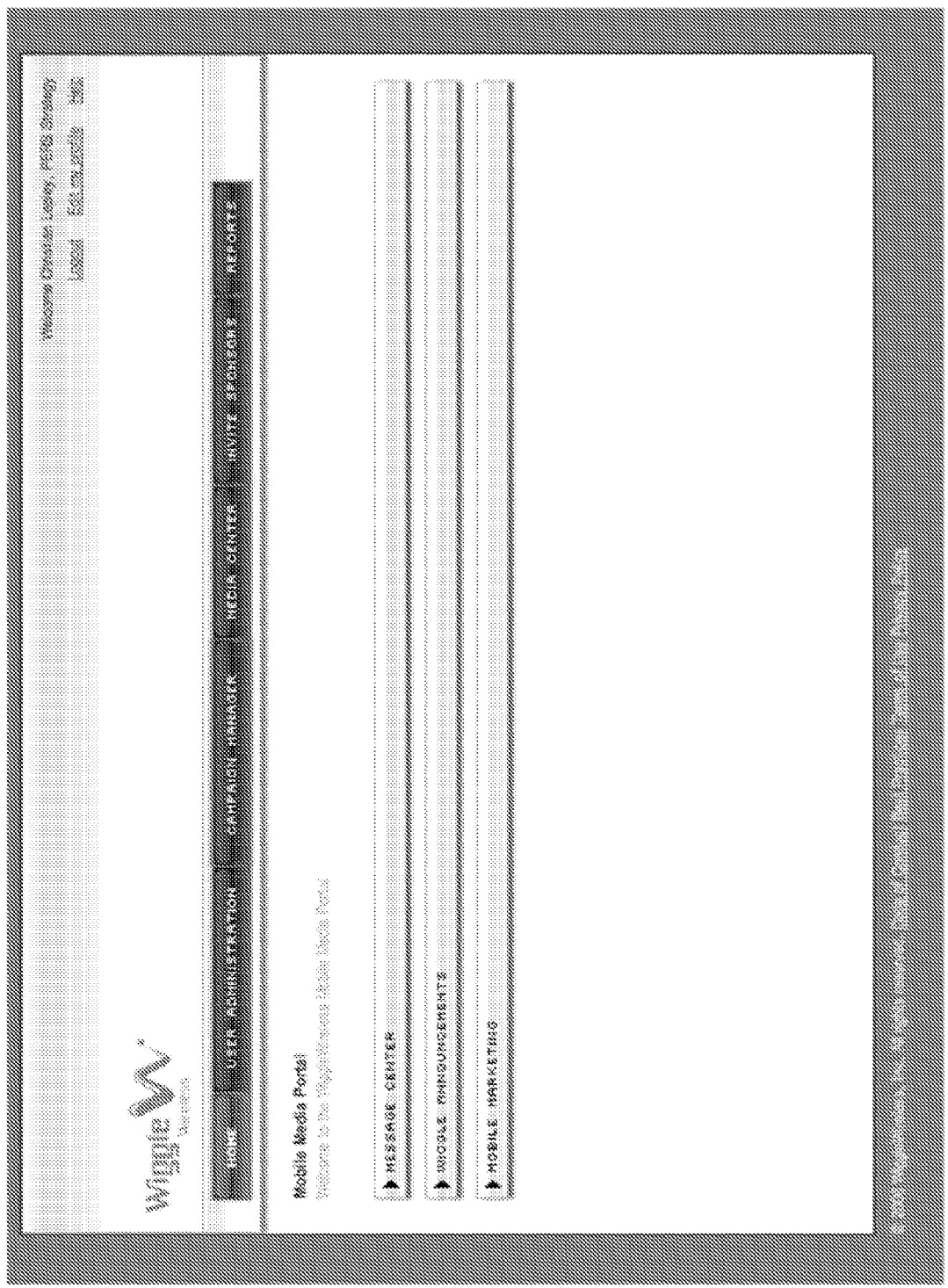

FIG. 10 shows an example home page for a media center interface. The home page may have security log-in features, as well as provide for messages and announcements. In one example, if the user is a campaign operator, the messages may be from sponsors interested in paying to have their marketing messages distributed with that event's content. If the campaign operator is interested in the sponsor, the mobile media system has other tools for facilitating negotiation and campaign development between the content owner and the sponsor, as previously described. It will be appreciated that many other types of information may be presented in a home screen, and that the home screen may be adapted to the specific requirements for a user.

Figure 11:
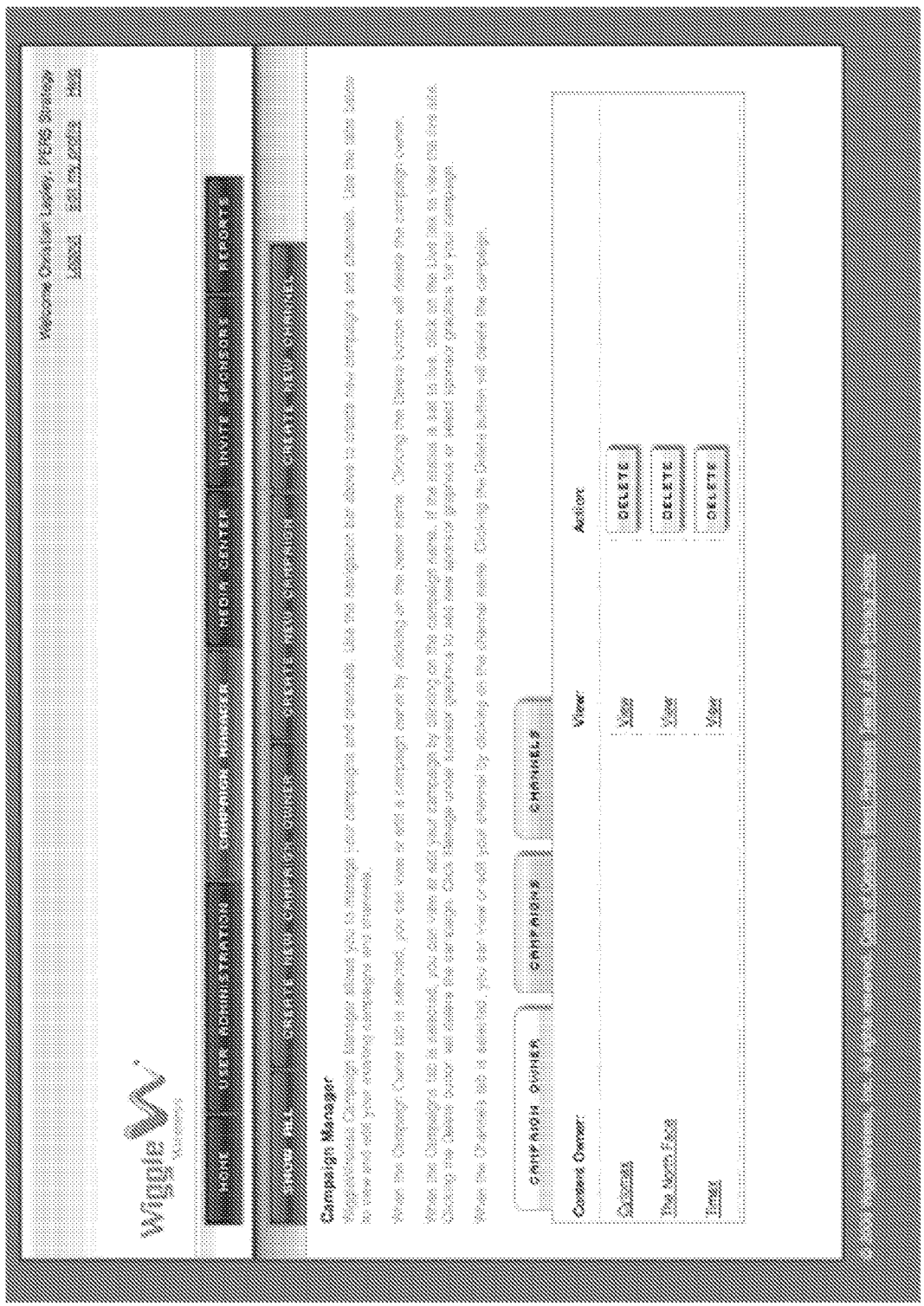
Figure 12:
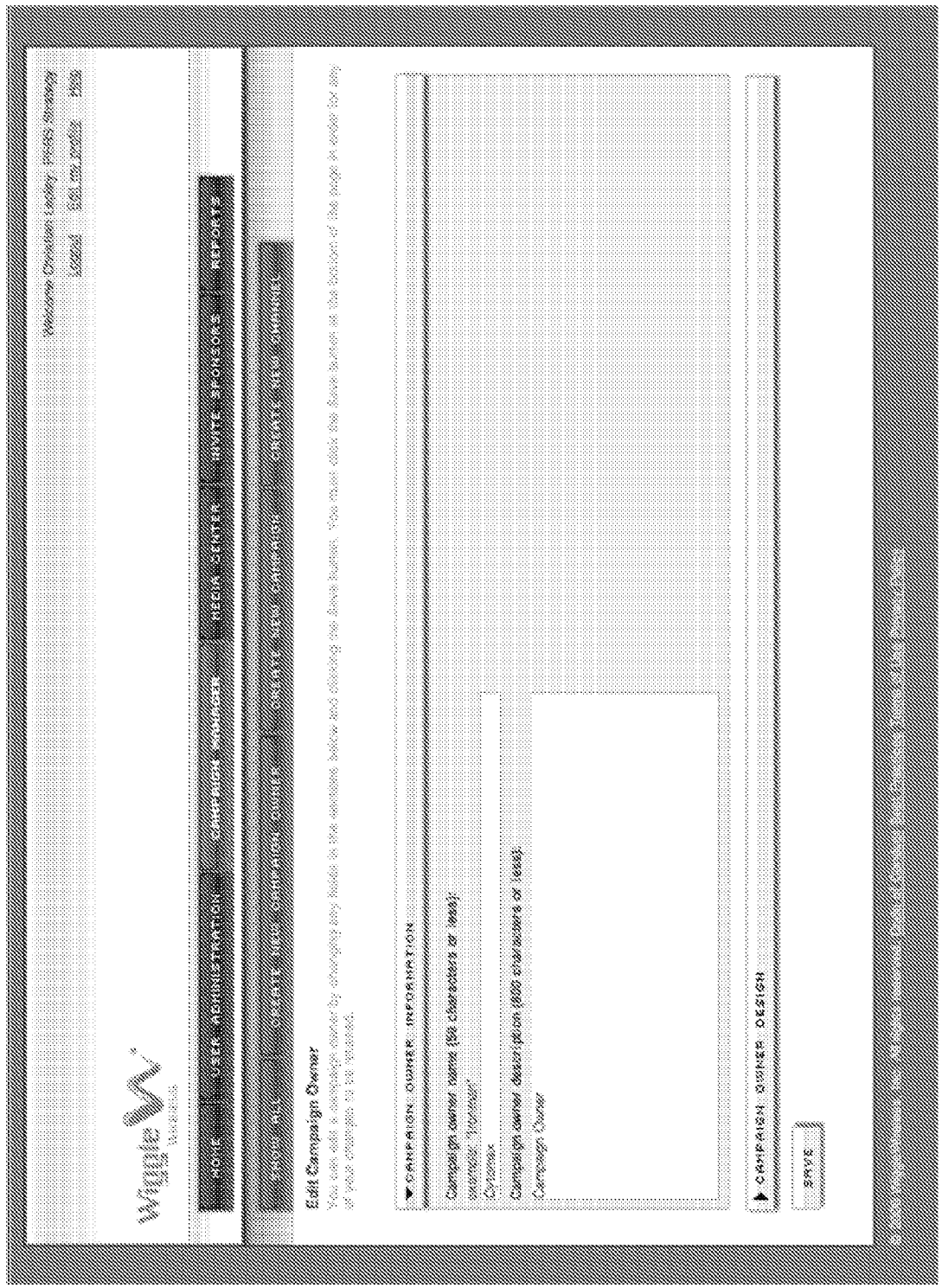
Figure 13:
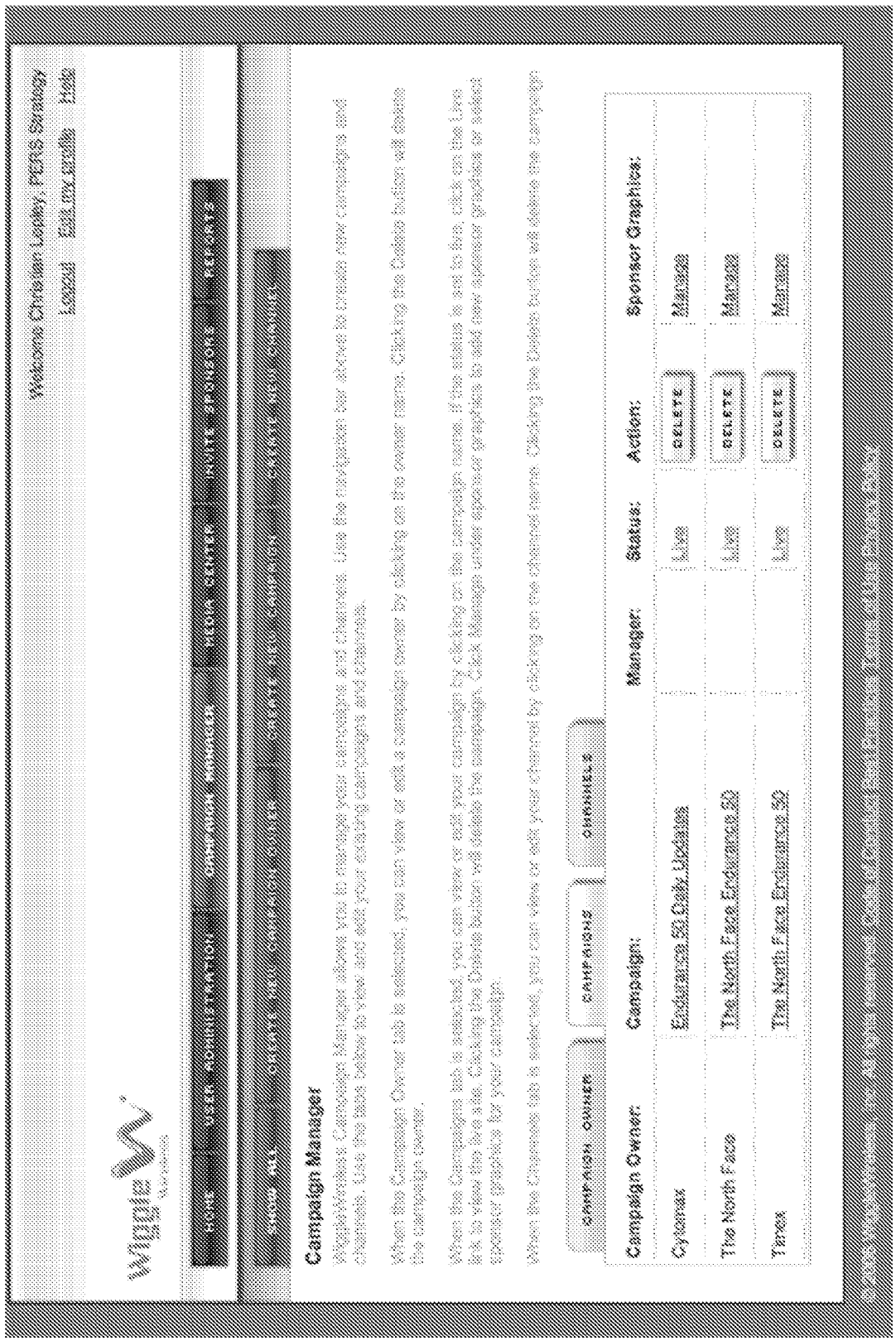
Figure 14:
Figure 15:
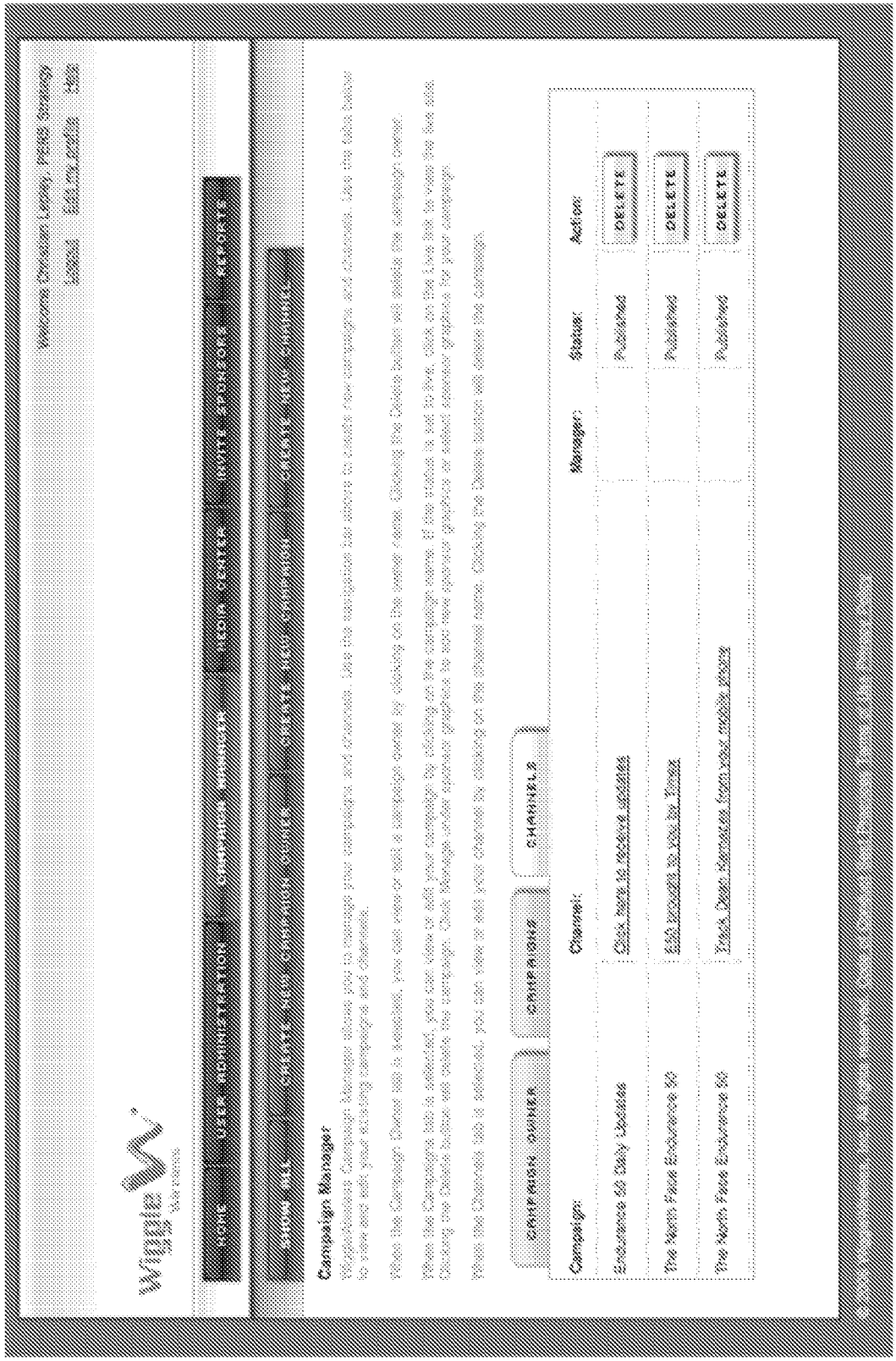
Figure 16:
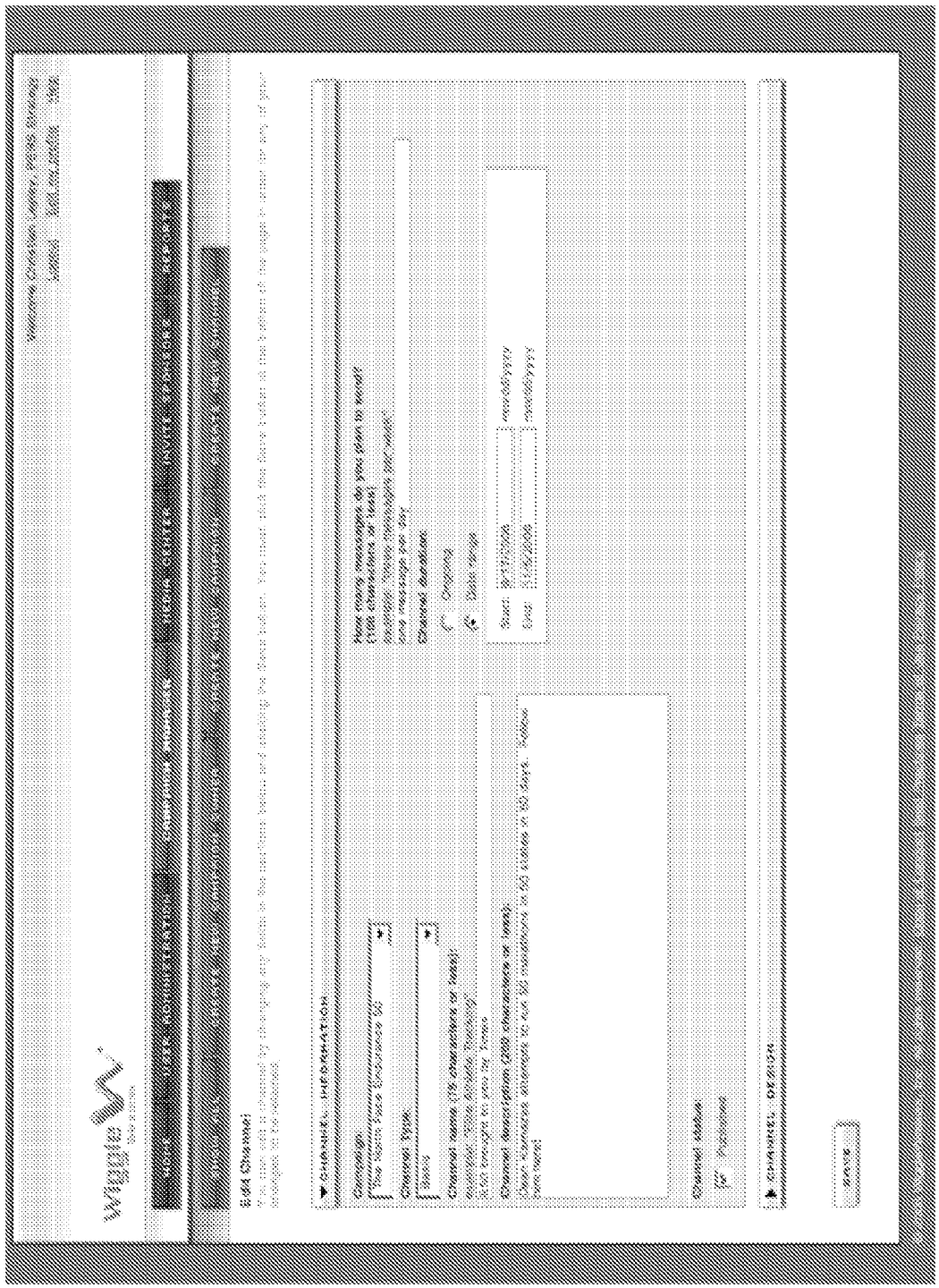

FIGS. 11 and 12 show example pages of a campaign manager. These pages are used, for example, by the publisher or campaign owner to build or manage campaigns. The publisher or campaign owner is able to view, delete, edit, and add campaign owners, as well as associate specific campaign owners with specific campaigns. As previously described, the campaign owner may be the entity providing the content, and in some cases, will also be the publisher. The campaign owner is able to add, edit, delete, and view campaigns, as shown in the example pages illustrated in FIGS. 13 and 14. As shown in the example pages illustrated in FIGS. 15 and 16, the campaign owner is allowed to add, edit, delete, and view channels that are available in a campaign.

Figure 17A:
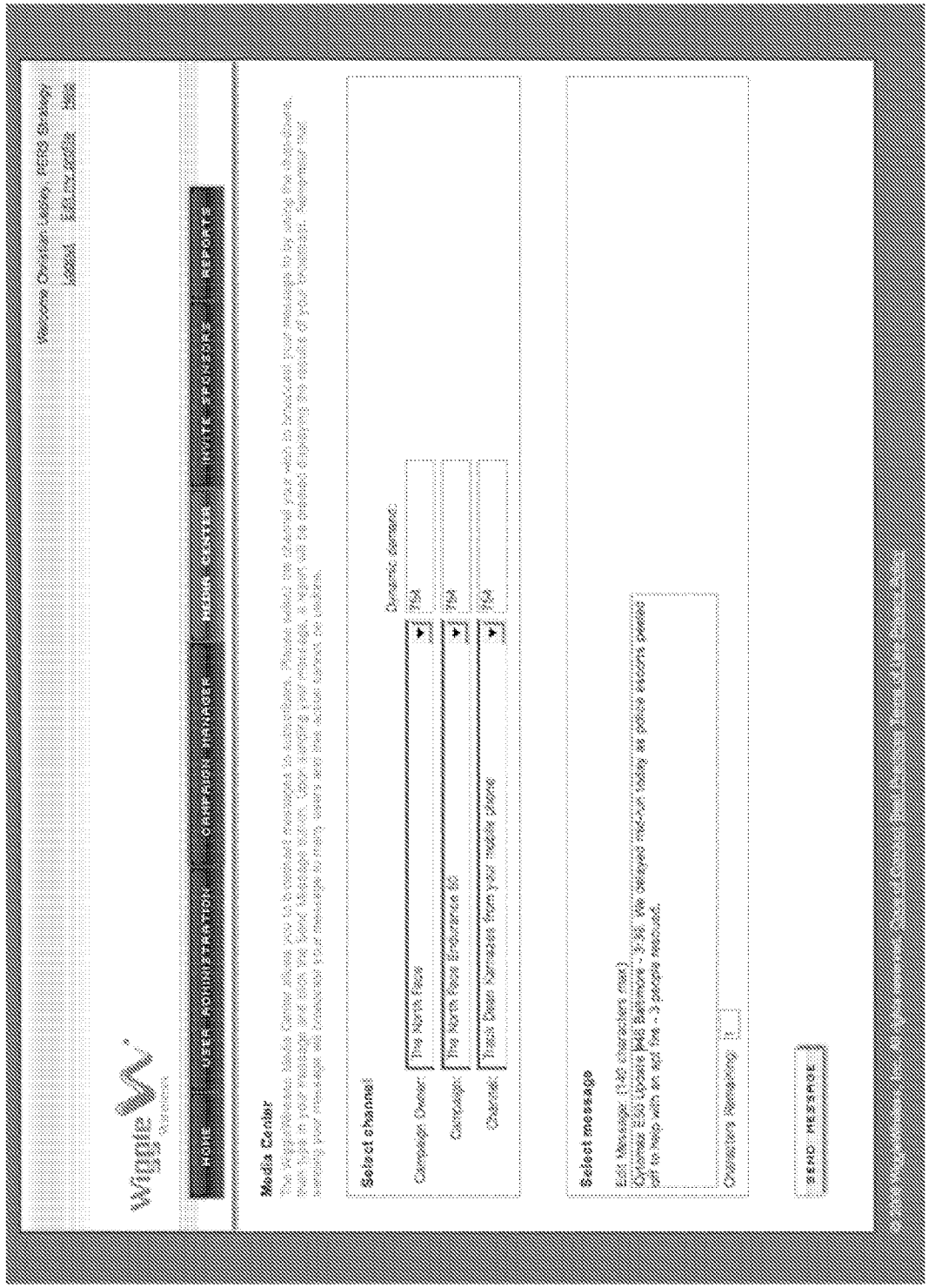
Figure 17B:
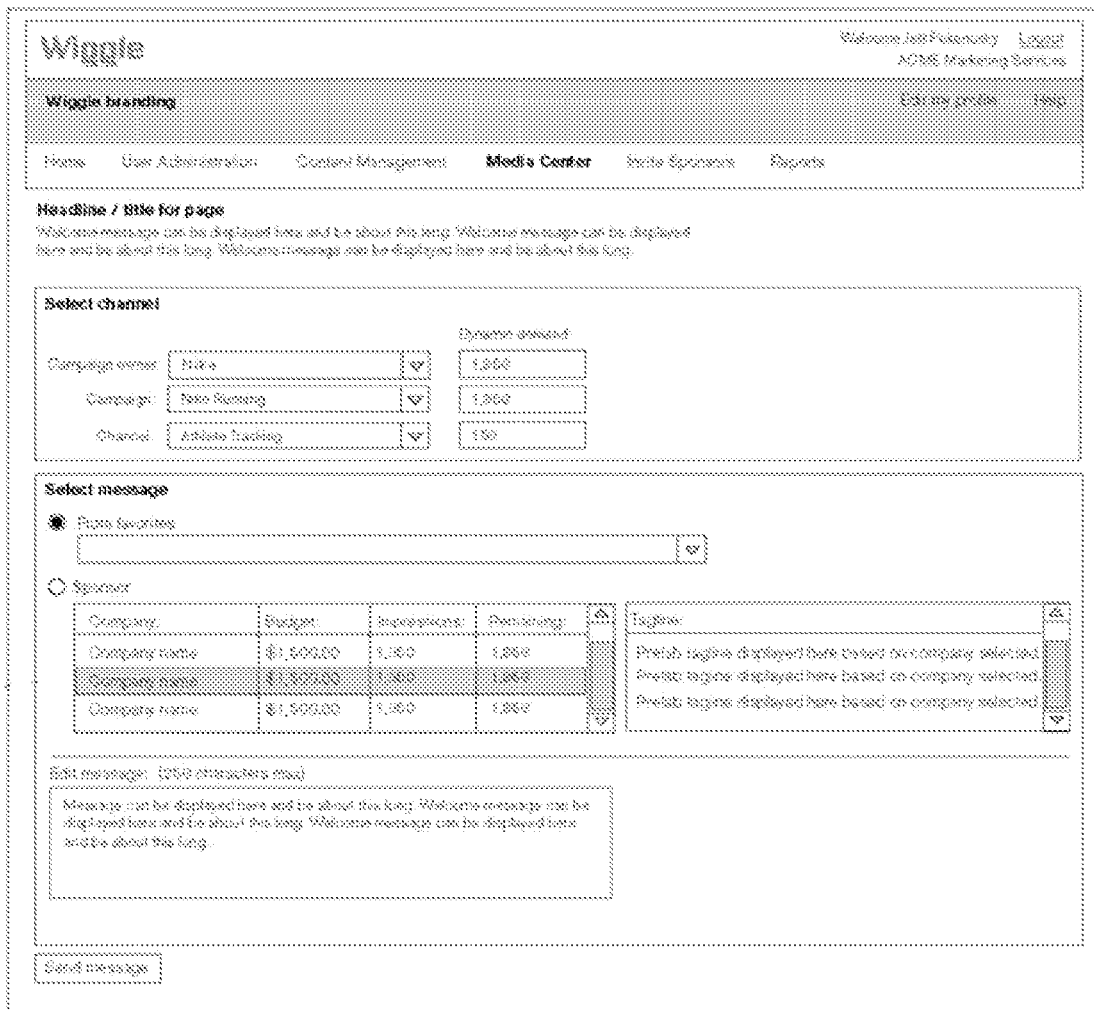

FIG. 17A shows an example page of a media center interface that allows a campaign operator to send a text message in near-real time to users subscribed to a particular channel. Here, the campaign operator selects a particular campaign owner, a particular campaign managed by the campaign owner, and a particular channel within the campaign. In this way, the message is sent only to those users that have requested this type of content information, and therefore will be very receptive to the message. FIG. 17A illustrates content as a real time message to users, but it will be appreciated that content may take the form of an audio file, video file, streaming video, image, automated timing data, location data, progress data, for example. As illustrated in FIG. 17B, a marketing message may also be sent to users, and since the marketing message is selected to appeal to those receiving the text message, it is likely the users also will respond positively to the marketing message. The marketing message may be sent automatically along with the content message, or may be sent separately. As illustrated in FIG. 17B, the media center interface may also account for the number of marketing messages sent, or allow real-time tracking of the marketing cost or remaining budget.

Figure 18:
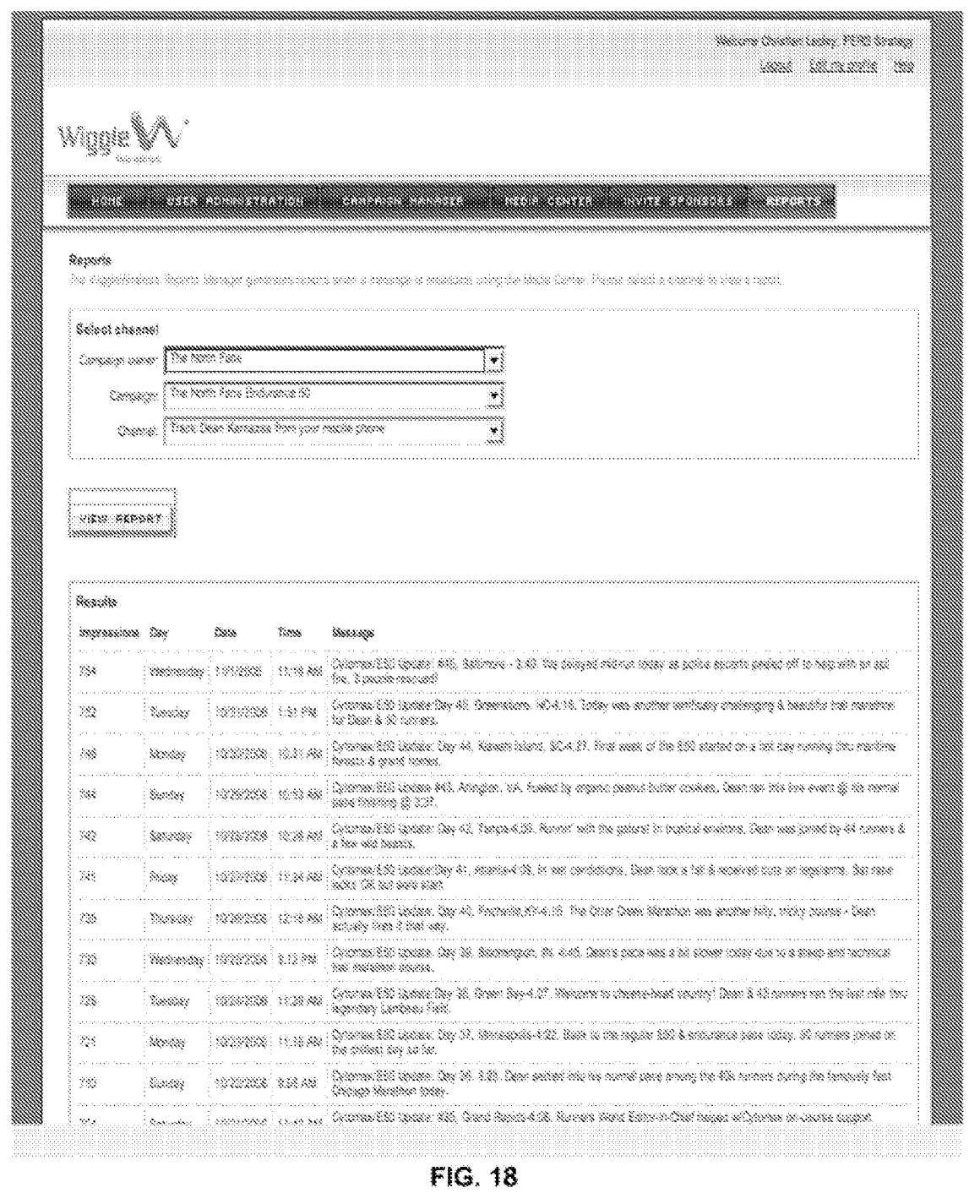

FIG. 18 shows an example page of just one of many reports available from the mobile media portal. This report shows a message-by-message accounting of how many users received each specific message. In this way, a sponsor is able to adjust marketing messages and strategies responsive to immediate information, or may use the information to settle payments at a later time. This immediate, accurate, and verifiable impression information is valuable to sponsors, and when combined with other available measurements and metrics, enables event managers and sponsors to maximize sponsor impact, and to maintain positive consumer relationships.

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed is:

1. A media control process operating on a computer, comprising:

receiving, by a computer, a request for media content by at least one consumer;

retrieving, by the computer, an advertisement from a set of advertisements based on the request, the advertisement having a target audience defined according to one or more demographic characteristics and according to one or more preferences that match the media content associated with the request;

selecting, by the computer and according to the target audience, a distribution list of selected consumers from a set of available consumers according to consumer information associated with each of the consumers in the set of available consumers, each of the selected consumers in the distribution list being associated with a mobile device, each of the mobile devices having a device capability for displaying the media content, the device capability including a display resolution for displaying video associated with the media content;

the consumer information further being derived in part from carrier data associated with the mobile device of each consumer, the carrier data including information from entities that manage mobile messaging for the mobile device of each consumer;

receiving, by the computer from a content provider via a network, media content associated with the request;

generating, by the computer, a distribution message for transmission to each mobile device associated with the selected consumers in the distribution list, the distribution message comprising at least part of the media content and the advertisement;

formatting by a transmission system a distribution message according to the device capability for each mobile device associated with the selected consumers in the distribution list, the formatting including formatting video associated with the media content in the distribution message according to the display resolution of each mobile device;

using a matching system operating on or in electronic communication with the computer, the content provider and a sponsor of the advertisement in the distribution message agreeing on a cost basis for provision of the distribution message;

using the transmission system, verifying that the distribution message including the advertisement has been received by one or more consumers in the distribution list; and for each verified receipt of the distribution message by a consumer on the distribution list, forwarding to the content provider, via the computer, an amount of revenue based on the agreed upon cost basis.

2. The media control process according to claim 1, further comprising:

retrieving, by the computer, one or more predefined scripts, each of the one or more predefined scripts having messages related to the media content; and wherein the distribution message is generated to comprise at least one of the one or more predefined scripts.

3. The media control process according to claim 1, further comprising:

the computer composing a message, the composed message being related to the media content; and wherein the distribution message is generated to comprise the composed message.

4. The media control process according to claim 1, further comprising:

retrieving, by the computer, a sponsor from a list of available sponsors; and wherein retrieving the advertisement is responsive to retrieving the sponsor.

5. The media control process according to claim 1, wherein receiving the media content comprises receiving near real-time data.

6. The media control process according to claim 1, wherein receiving the media content comprises receiving streaming video.

7. The media control process according to claim 1, wherein receiving the media content comprises receiving an audio, video, image or text file.

8. The media control process according to claim 1, wherein receiving the media content comprises receiving a multimedia message service or a short message service message.

* * * * *